United States Patent
Yang et al.

(10) Patent No.: US 12,108,388 B2
(45) Date of Patent: Oct. 1, 2024

(54) METHOD AND DEVICE FOR TRANSMITTING AND RECEIVING SIGNALS IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 17/603,510

(22) PCT Filed: May 4, 2020

(86) PCT No.: PCT/KR2020/005889
§ 371 (c)(1),
(2) Date: Oct. 13, 2021

(87) PCT Pub. No.: WO2020/226393
PCT Pub. Date: Nov. 12, 2020

(65) Prior Publication Data
US 2022/0264603 A1 Aug. 18, 2022

Related U.S. Application Data

(60) Provisional application No. 62/931,751, filed on Nov. 6, 2019, provisional application No. 62/875,993, filed on Jul. 19, 2019.

(30) Foreign Application Priority Data

| May 3, 2019 | (KR) | 10-2019-0052543 |
| Aug. 16, 2019 | (KR) | 10-2019-0100257 |
| Oct. 4, 2019 | (KR) | 10-2019-0123374 |

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC ..... H04L 1/0026; H04L 1/003; H04L 1/1671; H04L 1/1819; H04L 1/1854;
(Continued)

(56) References Cited

U.S. PATENT DOCUMENTS 9,686,064 B2 *  6/2017  He ................. H04L 5/0055
9,979,581 B2 *  5/2018  Yang .............. H04L 1/1822
(Continued)

FOREIGN PATENT DOCUMENTS

CN   113796040 A  * 12/2021 ........... H04L 5/0053
CN   113796140 A  * 12/2021 ........... H04L 1/0026
(Continued)

OTHER PUBLICATIONS

Extended European Search Report in European Appln. No. 20801934.9, dated Apr. 29, 2022, 10 pages.
(Continued)

*Primary Examiner* — Eric Nowlin
(74) *Attorney, Agent, or Firm* — Fish & Richardson P.C.

(57) ABSTRACT

The method and device for transmitting and receiving signals in a wireless communication system, according to one embodiment of the present invention, comprise: receiving downlink control information (DCI) for scheduling a single physical uplink shared channel (PUSCH) or a plurality of PUSCHs to be transmitted on a serving cell; and transmitting the single PUSCH or the plurality of PUSCHs on the serving cell on the basis of the DCI, wherein the payload size of the DCI may be determined on the basis of the larger one of the number of bits of the pieces of information for
(Continued)

scheduling the single PUSCH and the number of bits of the pieces of information for scheduling the plurality of PUSCHs.

9 Claims, 9 Drawing Sheets

(58) Field of Classification Search
CPC ..... H04L 1/1887; H04L 1/1896; H04L 5/001; H04L 5/0044; H04L 5/0094; H04W 72/0446; H04W 72/0453; H04W 72/1268; H04W 72/21; H04W 72/23; H04W 72/535; H04W 74/002; H04W 74/0808
See application file for complete search history.

(56) References Cited

U.S. PATENT DOCUMENTS

| | | | |
|---|---|---|---|
| 10,568,081 B2 * | 2/2020 | Papasakellariou | H04W 72/23 |
| 2017/0273056 A1 * | 9/2017 | Papasakellariou | H04W 52/146 |
| 2017/0302493 A1 * | 10/2017 | Yang | H04W 72/21 |
| 2021/0021384 A1 * | 1/2021 | Lin | H04L 1/1896 |
| 2021/0266105 A1 * | 8/2021 | Lei | H04W 28/04 |
| 2021/0377981 A1 * | 12/2021 | Li | H04L 5/0044 |
| 2021/0385838 A1 * | 12/2021 | Khoshnevisan | H04L 5/0087 |
| 2022/0150832 A1 * | 5/2022 | Yang | H04L 5/0053 |
| 2022/0166559 A1 * | 5/2022 | Lin | H04L 1/1614 |
| 2022/0174667 A1 * | 6/2022 | Lei | H04W 72/23 |
| 2022/0264603 A1 * | 8/2022 | Yang | H04L 1/0026 |

FOREIGN PATENT DOCUMENTS

| | | | | |
|---|---|---|---|---|
| CN | 111066269 B * | 7/2022 | ........... | H04L 1/0013 |
| CN | 115136522 B * | 1/2024 | | |
| EP | 3917053 A1 * | 12/2021 | ........... | H04L 1/1671 |
| EP | 3937578 A1 * | 1/2022 | ........... | H04L 1/0026 |
| EP | 3937579 A1 * | 1/2022 | ........... | H04L 5/0053 |
| EP | 3937579 B1 * | 3/2023 | ........... | H04L 5/0053 |
| EP | 3937578 B1 * | 10/2023 | ........... | H04L 1/0026 |
| KR | 20180119563 A * | 11/2018 | | |
| KR | 20200012840 A * | 2/2020 | | |
| KR | 20210004104 A * | 1/2021 | | |
| KR | 20210118199 A * | 9/2021 | | |
| KR | 20210118201 A * | 9/2021 | | |
| KR | 102606551 B1 * | 11/2023 | | |
| KR | 20230164216 A * | 12/2023 | | |
| WO | WO2013105838 | 7/2013 | | |
| WO | WO-2020226393 A1 * | 11/2020 | ........... | H04L 1/0026 |
| WO | WO-2020226395 A1 * | 11/2020 | ........... | H04L 5/0053 |
| WO | WO-2024007296 A1 * | 1/2024 | ........... | H04L 1/1896 |

OTHER PUBLICATIONS

Lenovo & Motorola Mobility, "HARQ enhancement for NR-U," R1-1904582, Presented at 3GPP TSG RAN WG1 #96bis, Xi'an, China, ath -Apr. 12, 2019, 7 pages.

MediaTek Inc., "Discussion on NR-U configured grant," R1-1904485, Presented at 3GPP TSG RAN WG1 #96bis, Xi'an, China, Apr. 8-12, 2019, 6 pages.

ZTE, "Discussion on UL Scheduling for LAA," R1-164575, Presented at 3GPP TSG RAN WG1 Meeting #85, Nanjing, China May 23-27, 2016, 5 pages.

Ericsson, "Feature Lead Summary for UL Signals and Channels," R1-1905671, 3GPP TSG-RAN WG1 Meeting #96b, Xi'an China, Feb. 8-12, 2019, 15 pages.

Etsi, "Multiplexing and Channel Coding," 3GPP TS 38.212 Version 15.5.0 Release 15, dated May 2019, 104 pages.

LG Electronics, "Discussion on Configured Grant for NR-U," R1-1904625, 3GPP TSG RAN WG1 Meeting #96bis, Xi'an, China, Apr. 8-12, 2019, 8 pages.

Nokia, Nokia Shanghai Bell, "Summary of Thursday Offline Discussion on PUSCH enhancements for NR eURLLC (AI 7.2.6.3)," R1-1905815, 3GPP TSG-RAN WG1 Meeting #96bis, Xi'an, China, Apr. 8-12, 2019, 21 pages.

PCT International Search Report and Written Opinion in International Appln No. PCT/KR2020/005889, dated Aug. 24, 2020, 15 pages.

* cited by examiner (a) Carrier aggregation between L-band and U-band (b) Standalone U-band(s)

METHOD AND DEVICE FOR TRANSMITTING AND RECEIVING SIGNALS IN WIRELESS COMMUNICATION SYSTEM

CROSS-REFERENCE TO RELATED APPLICATIONS

This application is a National Stage application under 35 U.S.C. § 371 of International Application No. PCT/KR2020/005889, filed on May 4, 2020, which claims the benefit of U.S. Provisional Application No. 62/931,751, filed on Nov. 6, 2019, Korean Application No. 10-2019-0123374, filed on Oct. 4, 2019, Korean Application No. 10-2019-0100257, filed on Aug. 16, 2019, U.S. Provisional Application No. 62/875,993, filed on Jul. 19, 2019, and Korean Application No. 10-2019-0052543, filed on May 3, 2019. The disclosures of the prior applications are incorporated by reference in their entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a method and apparatus for transmitting an uplink channel efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

In one aspect of the present disclosure, a method of transmitting and receiving a signal by a user equipment (UE) in a wireless communication system is provided. The method may include: receiving downlink control information (DCI) scheduling a single physical uplink shared channel (PUSCH) or multiple PUSCHs to be transmitted on a serving cell; and transmitting the single PUSCH or the multiple PUSCHs on the serving cell based on the DCI. A payload size of the DCI may be determined based on a larger of a number of information bits for scheduling the single PUSCH and a number of information bits for scheduling the multiple PUSCHs.

In another aspect of the present disclosure, a communication apparatus (UE) configured to transmit and receive a signal in a wireless communication system is provided. The communication apparatus may include: at least one transceiver; at least one processor; and at least one memory operably connected to the at least one processor and configured to store instructions that, when executed, cause the at least one processor to perform operations including: receiving DCI scheduling a single PUSCH or multiple PUSCHs to be transmitted on a serving cell; and transmitting the single PUSCH or the multiple PUSCHs on the serving cell based on the DCI. A payload size of the DCI may be determined based on a larger of a number of information bits for scheduling the single PUSCH and a number of information bits for scheduling the multiple PUSCHs.

In another aspect of the present disclosure, an apparatus for a UE is provided. The apparatus may include: at least one processor; and at least one computer memory operably connected to the at least one processor and configured to, when executed, cause the at least one processor to perform operations including: receiving DCI scheduling a single PUSCH or multiple PUSCHs to be transmitted on a serving cell; and transmitting the single PUSCH or the multiple PUSCHs on the serving cell based on the DCI. A payload size of the DCI may be determined based on a larger of a number of information bits for scheduling the single PUSCH and a number of information bits for scheduling the multiple PUSCHs.

In another aspect of the present disclosure, a computer readable storage medium having at least one computer program that, when executed, cause at least one processor to perform operations. The operations may include: receiving DCI scheduling a single PUSCH or multiple PUSCHs to be transmitted on a serving cell; and transmitting the single PUSCH or the multiple PUSCHs on the serving cell based on the DCI. A payload size of the DCI may be determined based on a larger of a number of information bits for scheduling the single PUSCH and a number of information bits for scheduling the multiple PUSCHs.

In another aspect of the present disclosure, a method of transmitting and receiving a signal by a base station in a wireless communication system is provided. The method may include: transmitting DCI scheduling a single PUSCH or multiple PUSCHs to be transmitted on a serving cell; and receiving the single PUSCH or the multiple PUSCHs on the serving cell based on the DCI. A payload size of the DCI may be determined based on a larger of a number of information bits for scheduling the single PUSCH and a number of information bits for scheduling the multiple PUSCHs.

In a further aspect of the present disclosure, a communication apparatus (base station) configured to transmit and receive a signal in a wireless communication system is provided. The communication apparatus may include: at least one transceiver; at least one processor; and at least one memory operably connected to the at least one processor and configured to store instructions that, when executed, cause the at least one processor to perform operations including: transmitting DCI scheduling a single PUSCH or multiple PUSCHs to be transmitted on a serving cell; and receiving the single PUSCH or the multiple PUSCHs on the serving cell based on the DCI. A payload size of the DCI may be determined based on a larger of a number of information bits for scheduling the single PUSCH and a number of information bits for scheduling the multiple PUSCHs.

In the methods and apparatuses, the payload size of the DCI may be determined based on the larger of the number of information bits for scheduling the single PUSCH and the number of information bits for scheduling the multiple PUSCHs, by adding zero padding to a smaller of the number of information bits for scheduling the single PUSCH and the number of information bits for scheduling the multiple PUSCHs.

In the methods and apparatuses, the DCI may include a codeblock group transmission information (CBGTI) field based on the scheduling of the single PUSCH, and the DCI may include no CBGTI field based on the scheduling of the multiple PUSCHs.

In the methods and apparatuses, the DCI may include an uplink shared channel (UL-SCH) indicator field based on the scheduling of the single PUSCH, and the DCI may include no UL-SCH indicator field based on the scheduling of the multiple PUSCHs.

In the methods and apparatuses, the DCI may include a two-bit redundancy version (RV) field based on the scheduling of the single PUSCH, and the DCI may include an N-bit RV field based on the scheduling of the multiple PUSCHs.

In the methods and apparatuses, the DCI may include a one-bit new data indicator (NDI) field based on the scheduling of the single PUSCH, and the DCI may include an N-bit NDI field based on the scheduling of the multiple PUSCHs.

In the methods and apparatuses, the N bits may be determined based on a maximum number of PUSCHs schedulable by the DCI, and each of the N bits may be related to one PUSCH among the schedulable PUSCHs.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication apparatus may transmit an uplink channel more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
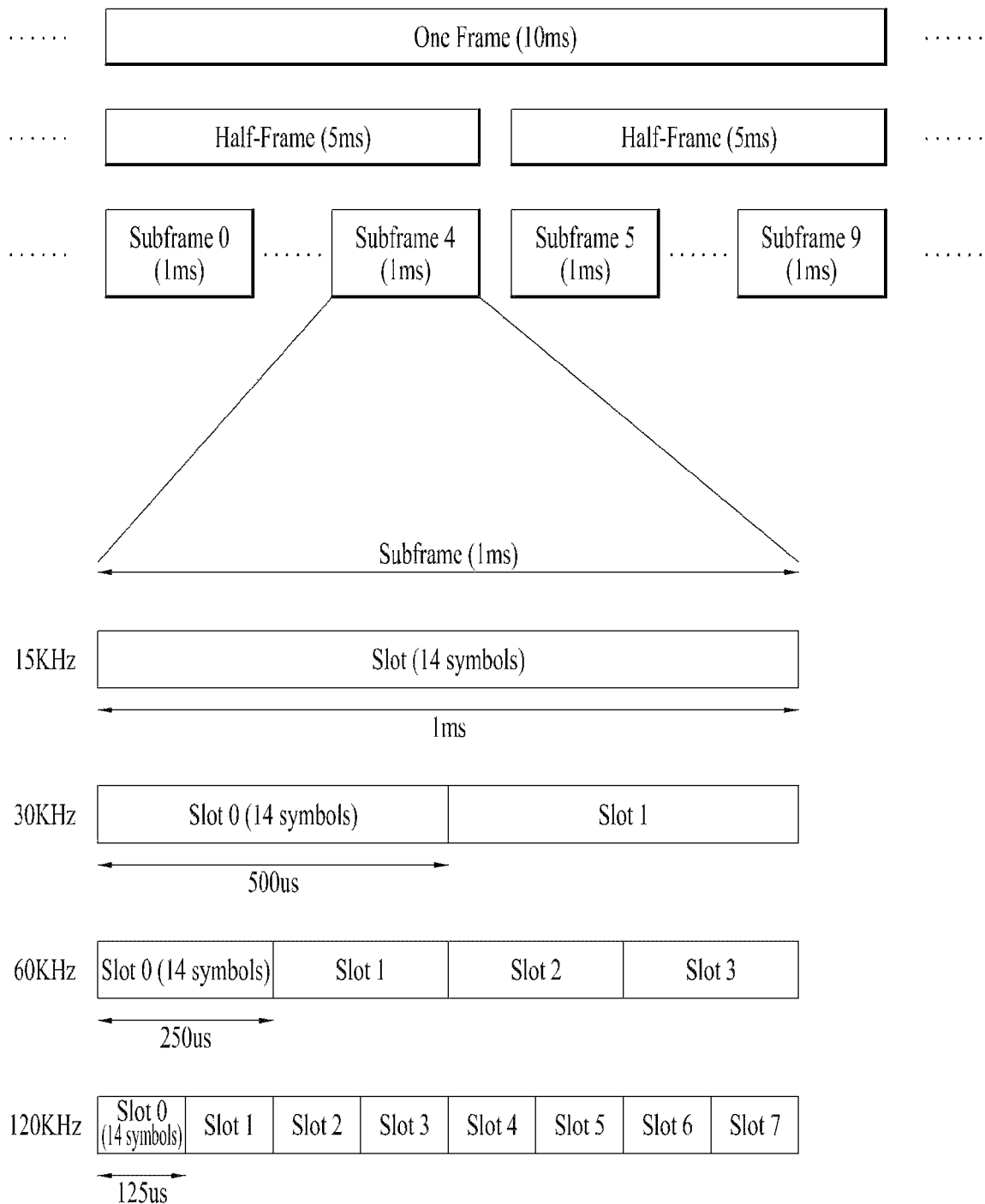
FIG. 1 illustrates a radio frame structure.

3GPP LTE
   36.211: Physical channels and modulation
   36.212: Multiplexing and channel coding
   36.213: Physical layer procedures
   36.300: Overall description
   36.331: Radio Resource Control (RRC)
   3GPP NR
   38.211: Physical channels and modulation
   38.212: Multiplexing and channel coding
   38.213: Physical layer procedures for control
   38.214: Physical layer procedures for data
   38.300: NR and NG-RAN Overall Description
   38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame, u}_{slot}$: of slots in a frame
*$N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 2:
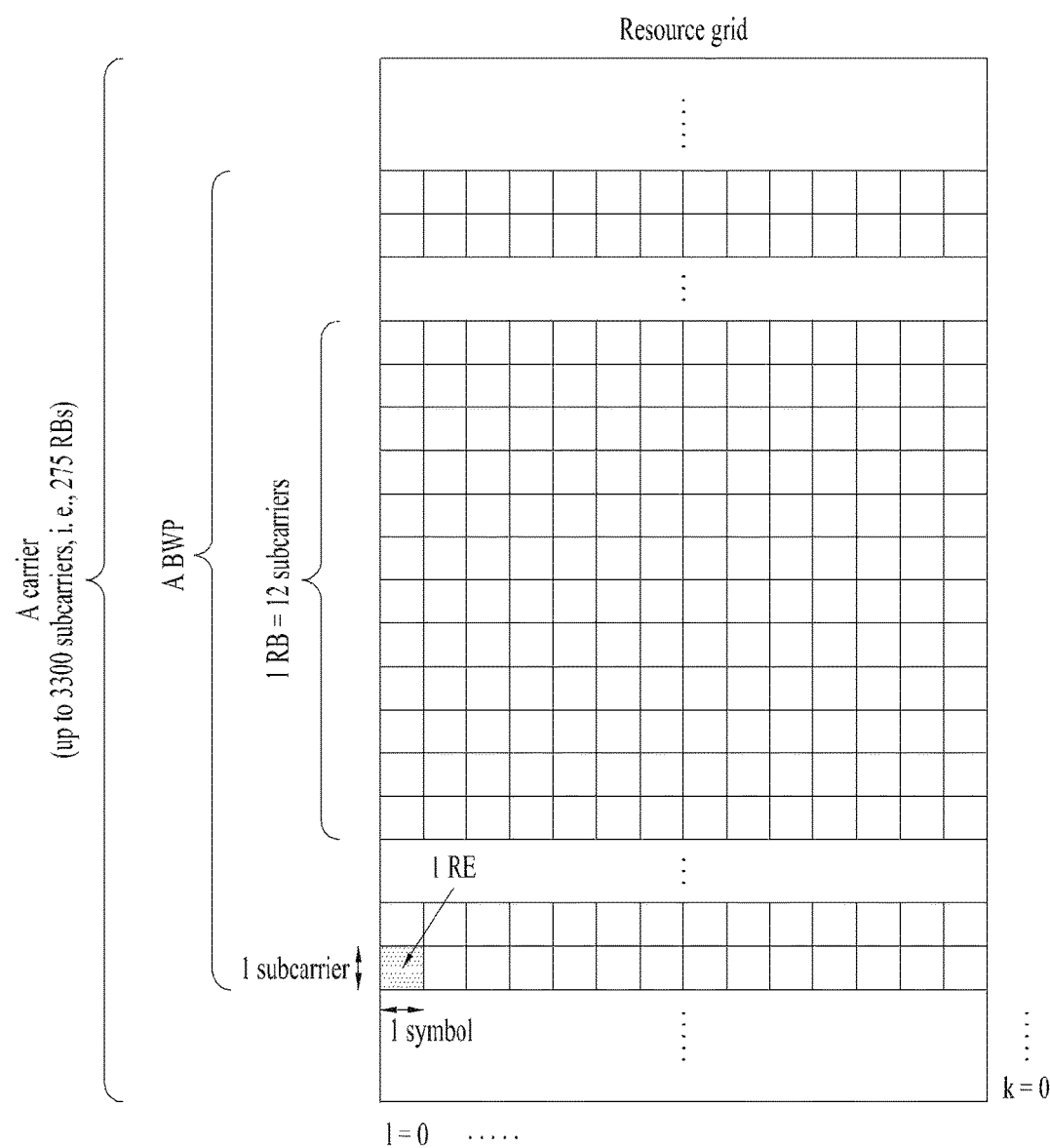
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 3:
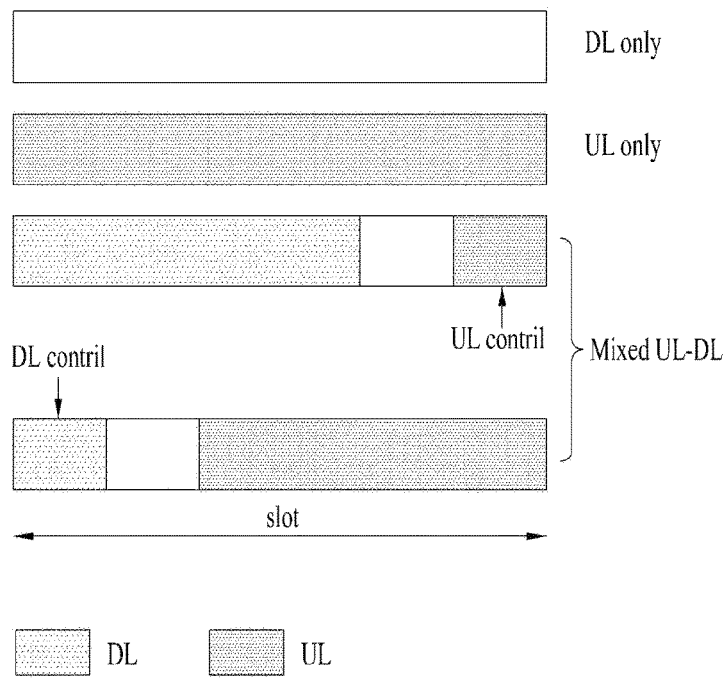
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

Figure 4:
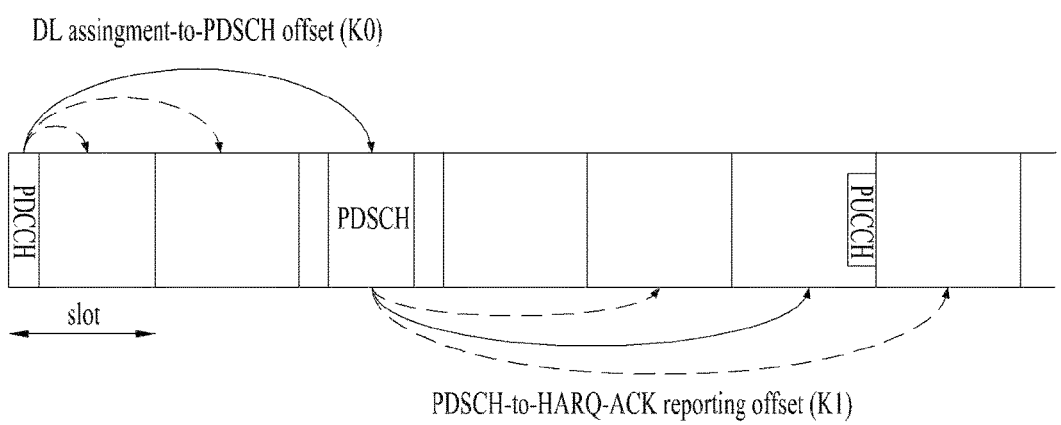
FIG. 4 illustrates an acknowledgment/negative acknowledgment (ACK/NACK) transmission process.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g., OFDM symbol index) and length (e.g., the number of OFDM symbols) of the PDSCH in a slot.

PDSCH-to-HARQ feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 5:
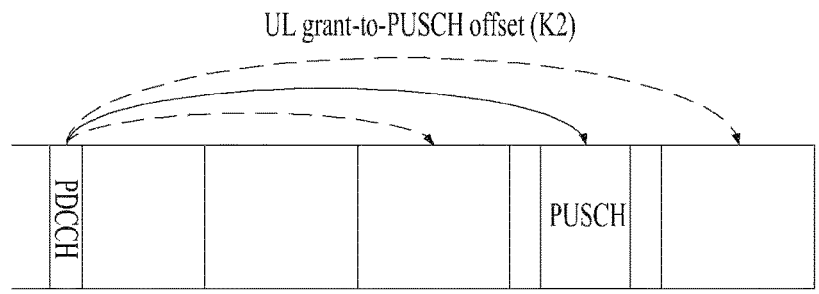
FIG. 5 illustrates a physical uplink shared channel (PUSCH) transmission process.

FIG. 5 illustrates an exemplary PUSCH transmission process. Referring to FIG. 5, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 6:
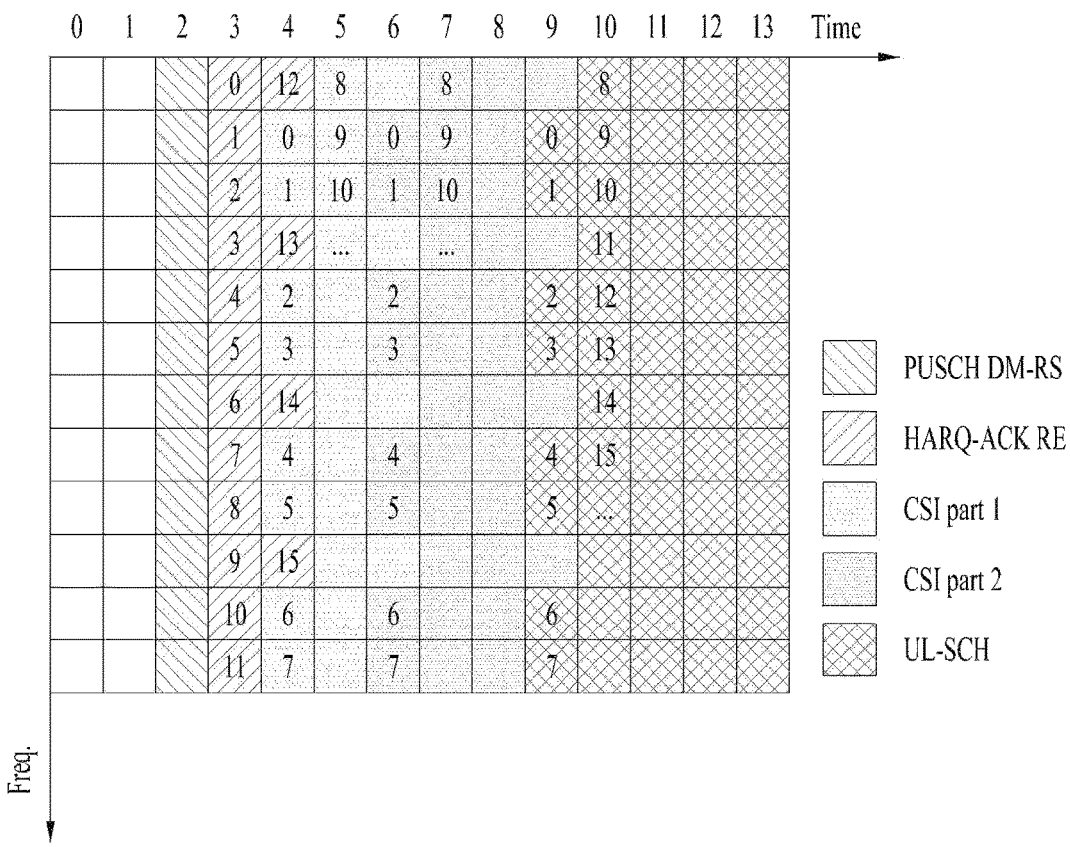
FIG. 6 illustrates exemplary multiplexing of control information in a PUSCH.

FIG. 6 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

1. Wireless Communication System Supporting Unlicensed Band

Figure 7:
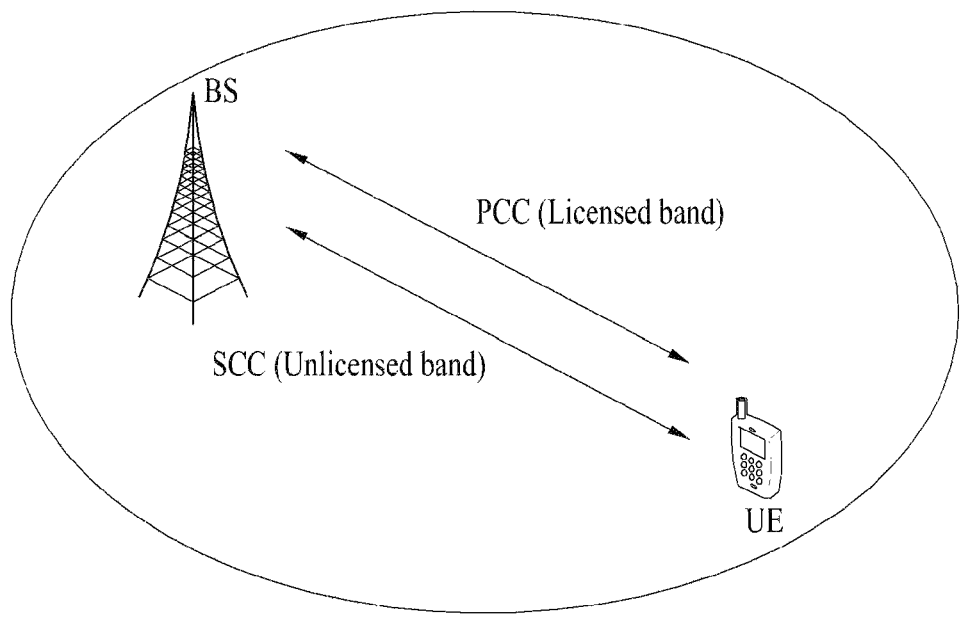
FIG. 7 illustrates a wireless communication system supporting an unlicensed band.
Figure 7:
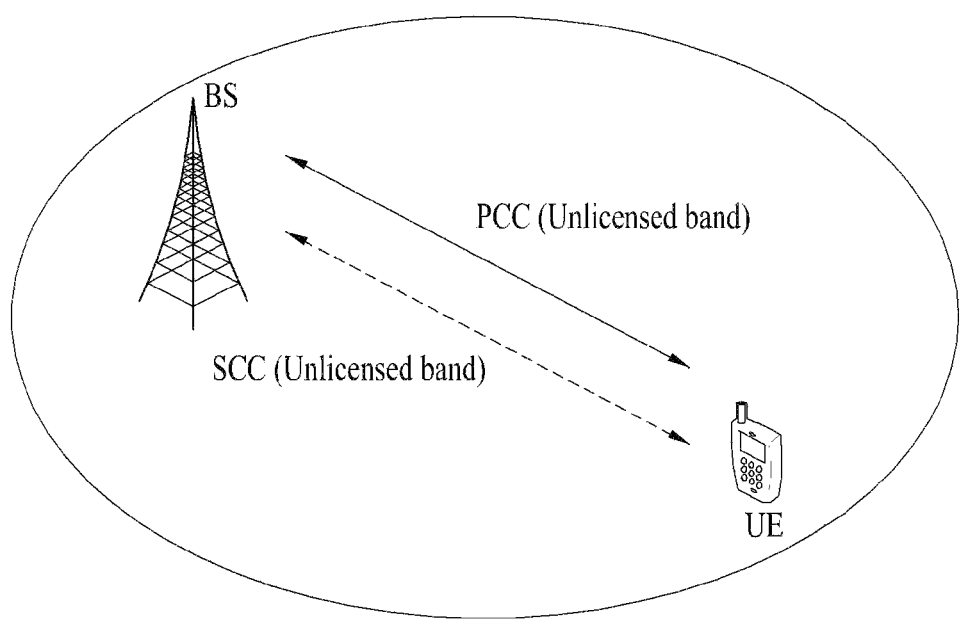

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 7(a), the LCC may be configured as a primary CC (PCC) and the UCC may be configured as a secondary CC (SCC). As illustrated in FIG. 7(b), the UE and the BS may transmit and receive signals in one UCC or a plurality of carrier-aggregated UCCs. That is, the UE and the BS may transmit and receive signals only in UCC(s) without an LCC.

Unless otherwise specified, a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, etc.). In recent years, data traffic has significantly increased with the advent of smart devices. Thus, the 3GPP NR system has also considered the use of an unlicensed band for cellular communication as in License-Assisted Access (LAA) of the legacy 3GPP LTE system. However, unlike the LAA, a NR cell in the unlicensed-band (NR U-cell) aims to support standalone operation. For example, PUCCH, PUSCH, and/or PRACH transmission may be supported in the NR UCell.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

Figure 8:
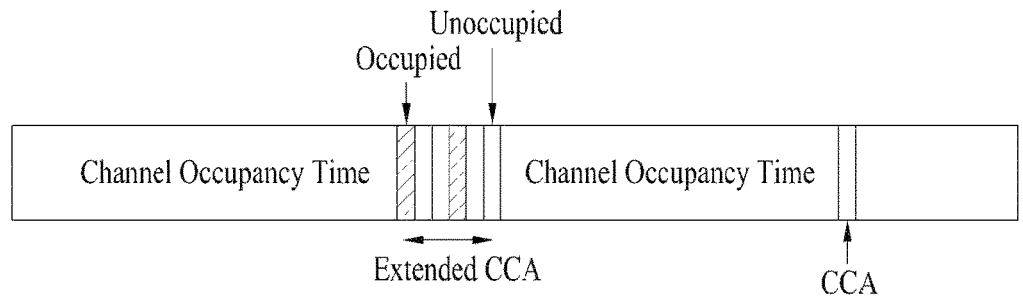
FIG. 8 illustrates an exemplary method of occupying resources in an unlicensed band.

FIG. 8 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.

Method of Transmitting DL Signal in Unlicensed Band

To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP Method

Figure 9:
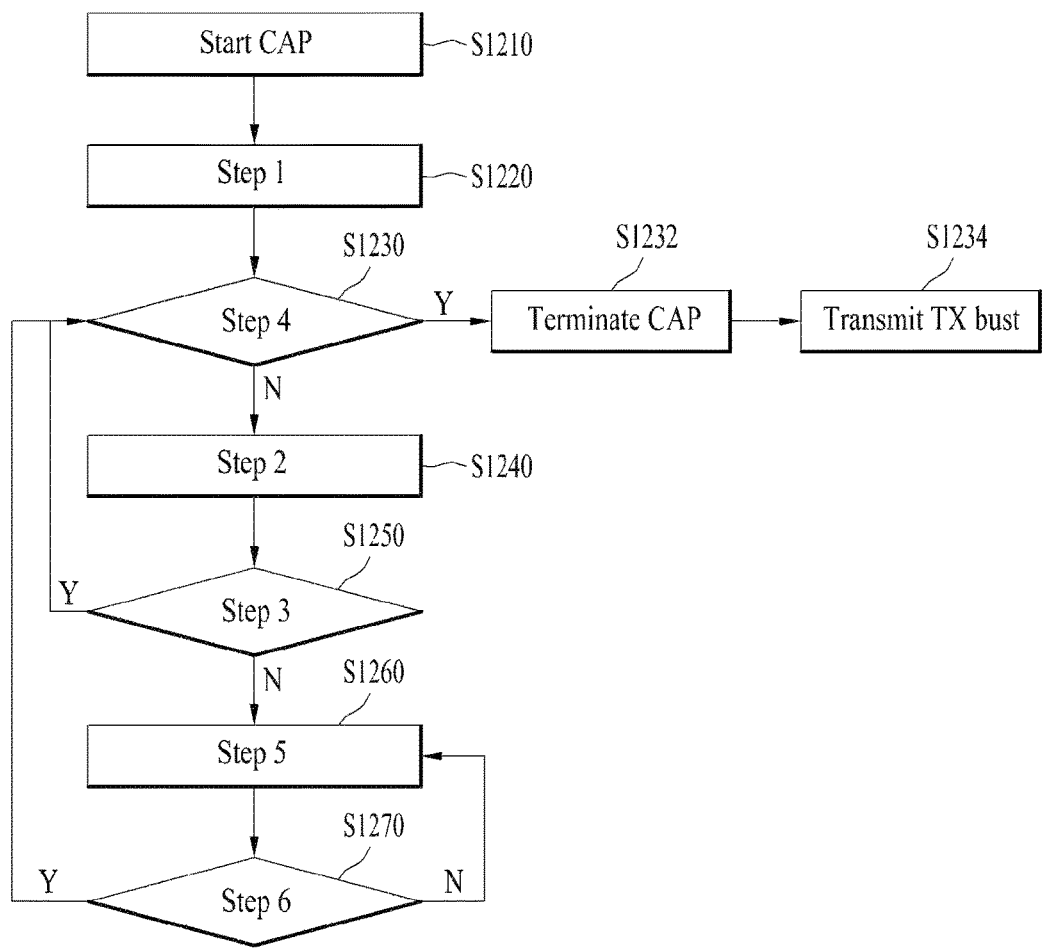
FIGS. 9 and 10 are flowcharts illustrating channel access procedures (CAPs) for signal transmission in an unlicensed band.

FIG. 9 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value $N_{init}$ (S1220). $N_{init}$ is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration $T_d$ (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 3 illustrates that mp, a minimum CW, a maximum CW, a maximum channel occupancy time (MCOT), and an allowed CW size applied to a CAP vary according to channel access priority classes.

TABLE 3

| Channel Access Priority Class (p) | $m_p$ | $CW_{min,p}$ | $CW_{max,p}$ | $T_{mcotp}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 1 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining Ninit for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 10:
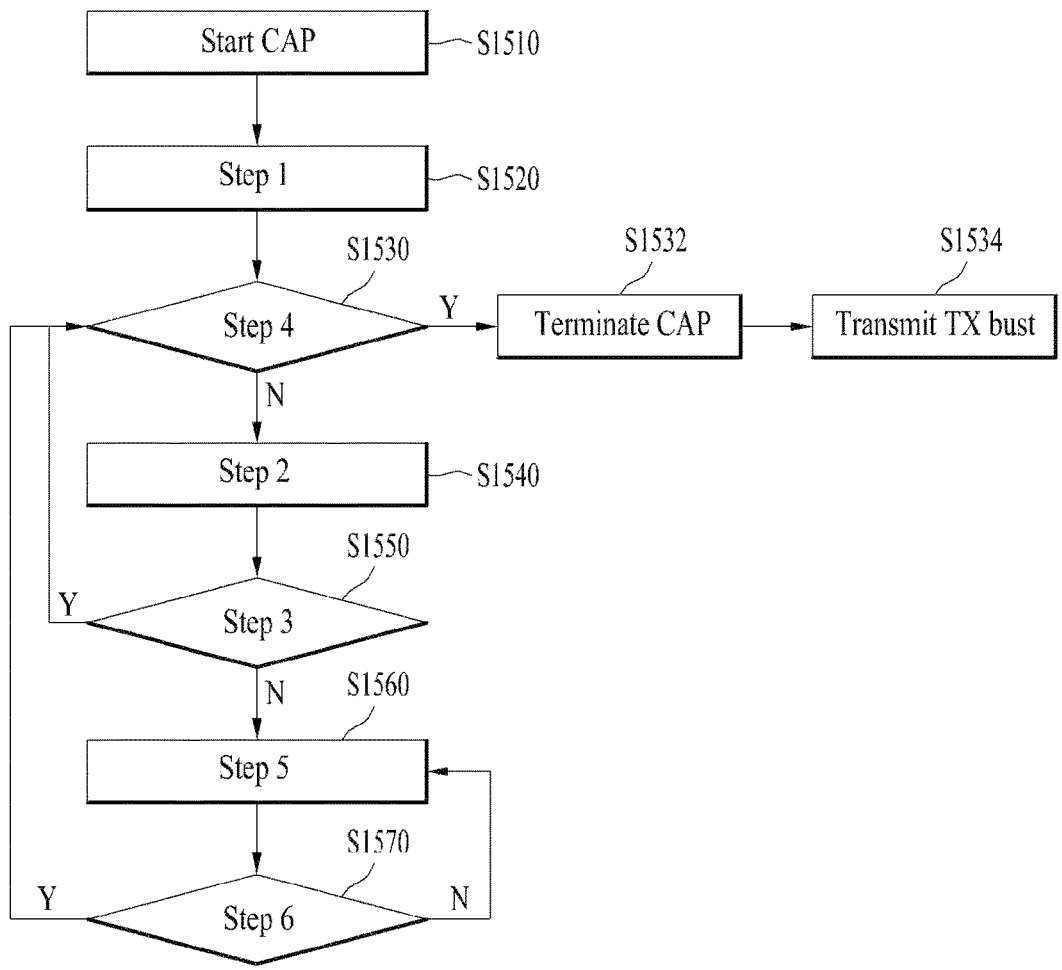

FIG. 10 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 4 shows that the values of $m_p$, a minimum CW, a maximum CW, a maximum channel occupancy time (MCOT), and allowed CW sizes, which are applied to the CAP, vary depending on channel access priority classes.

TABLE 4

| Channel Access Priority Class (p) | $m_p$ | $CW_{min,p}$ | $CW_{max,p}$ | $T_{ulmcotp}$ | allowed $CW_p$ sizes |
|---|---|---|---|---|---|
| 1 | 2 | 3 | 7 | 2 ms | {3, 7} |
| 7 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcotp}$ = 10 ms if the higher layer parameter 'absenceOfAnyOtherTechnology-r14' indicates TRUE, otherwise, $T_{ulmcotp}$ = 6 ms.
NOTE 2:
When $T_{ulmcotp}$ = 6 ms it may be increased to 8 ms by inserting one or more gaps. The minimum duration of a gap shall be 100 μs. The maximum duration before including any such gap shall be 6 ms.

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p∈{1, 2, 3, 4}. Otherwise, the UE may increase $CW_p$ for every priority class p∈{1, 2, 3, 4} to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0$, $n_1$, ... $n_w$, starting from the subframe (or slot) $n_0$ without a gap (the subframe (or slot) $n_w$ is the most recent subframe (or slot) before a subframe (or slot) $n_g-3$ in which the UE has transmitted a UL-SCH based on a Type 1 CAP), the reference subframe (or slot) $n_{ref}$ is the subframe (or slot) $n_0$.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

PUSCH Transmission in U-Band

The present disclosure proposes methods of scheduling a plurality of PUSCHs transmitted in a plurality of slots with one DCI by considering the DCI overhead required for UL data scheduling and the LBT operation of a UE required before UL transmission for U-band operations. The methods proposed in the present disclosure are not limited to LBT-based U-band operations, and the embodiments of the present disclosure may be equally/similarly applied to L-band (or U-band) operations accompanied by no LBT. For PUSCH signal transmission, the following two data mapping types may be considered.

1) Data Mapping Type A

A. A structure in which a DMRS is mapped/transmitted to/in a specific symbol position/index (e.g., symbol index Y) in a slot i. For example, the DMRS may be mapped/transmitted to/in a third or fourth OFDM symbol in the slot.

2) Data Mapping Type B

A. A structure in which a DMRS is mapped/transmitted to/in a specific symbol position (e.g., X-th symbol) within a PUSCH duration i. For example, the DMRS may be mapped/transmitted to/in the first OFDM symbol within the PUSCH duration.

(1) Embodiment 1

Embodiment 1 proposes a scheduling method where one DCI indicates a plurality of PUSCH transmission resources over a plurality of slot sets. Specifically, according to the scheduling method, 1) one or a plurality of sub-slot duration PUSCH resources (having a symbol duration smaller than a slot) are allocated to the first slot in the corresponding slot set, 2) one sub-slot (or slot) duration PUSCH resource is allocated to the last slot, and 3) a slot duration PUSCH resource is allocated to each of the remaining middle slot(s).

A single sub-slot duration PUSCH allocated to the first slot and a sub-slot duration PUSCH allocated to the last slot may have different symbol durations. In particular, the duration of the PUSCH allocated to the last slot may be configured to be greater than or equal to the duration of the single PUSCH allocated to the first slot. More specifically, the following DCI signaling and PUSCH resource determination method (for the UE) may be considered in Embodiment 1.

1) Opt 1
A. DCI Signaling for PUSCH Scheduling i. The DCI may indicate 1) a first slot index K where PUSCH transmissions/resources are indicated, 2) an in-slot starting symbol index S and a symbol duration D of the first sub-slot duration PUSCH resource in the corresponding first slot, and 3) the number of repetitions of the corresponding sub-slot duration PUSCH resource R.

B. Determination of PUSCH Resources
I. Step 1

1. The duration D is repeatedly mapped R times to be adjacent to each other (over a plurality of slots), starting from the symbol index S in the first slot. A plurality of slots to which at least one sub-slot duration PUSCH resource is mapped are grouped into a slot set (the following symbol processing method is referred to as a "slot-filling" method for convenience).

a. In Step 1 (for example, for the first slot), if the duration D (the number of corresponding symbols) is not a divisor of a duration X (the number of symbols in the duration X) from the symbol index S to the last symbol of the slot, 1) the sub-slot duration PUSCH may be repeated/mapped the maximum number of durations D in the duration X, and the sub-slot duration PUSCH may be repeated/mapped continuously by switching to the next slot (from the first symbol in the corresponding slot), or 2) the sub-slot duration PUSCH of the duration D may be repeated/mapped over consecutive symbols while slot boundaries are ignored.

i. Assuming that the number of sub-slot duration PUSCHs of the duration D repeated/mapped in a slot (which is a complete form and not a partial form) is L, the length of the last sub-slot duration PUSCH in the (first) slot (or the number of symbols) may be determined/assigned as/to {X−D(L−1)} (which is greater than D).

b. (For example, for the middle slot), if the duration D (the number of corresponding symbols) is not a divisor of the slot duration (the number of corresponding symbols), 1) the sub-slot duration PUSCH may be repeated/mapped the maximum number of durations D within the slot duration, and the sub-slot duration PUSCH may be repeated/mapped continuously by changing to the next slot (from the first symbol in the slot), or 2) the sub-slot duration PUSCH of the duration D may be repeated/mapped over consecutive symbols while slot boundaries are ignored.

II. Step 2

1. For the first slot in the slot set, one or more L sub-slot duration PUSCH resources mapped to the corresponding slot are determined as individual/independent L PUSCH resources, respectively.

III. Step 3

1. For the last slot in the slot set, one or more M sub-slot duration PUSCH resources mapped to the corresponding slot are merged into one and determined as a single PUSCH resource having a symbol duration of {M×D}.

IV. Step 4

For the middle slot in the slot set, a plurality of N sub-slot duration PUSCH resources mapped to each slot are merged into one and determined as a single PUSCH resource having a symbol duration or slot duration of {N×D}.

2) Opt 2

A. DCI Signaling for PUSCH Scheduling i. The DCI may indicate 1) a first slot index K where PUSCH transmissions/resources are indicated, 2) an in-slot starting symbol index S and a symbol duration D of the first sub-slot duration PUSCH resource in the corresponding first slot, 3) the number of repetitions of the corresponding sub-slot duration PUSCH resource R, and 4) the number of middle slots to which slot duration PUSCH resources are allocated N_m or the total number of slots to which PUSCH resources are allocated N_s (in this case, it is assumed that N_m=N_s−2).

B. Determination of PUSCH Resources

I. Step 1

1. To configure a slot set, consecutive N_m slots are determined as middle slots starting from K+1, which is the slot index immediately following the first slot, and K+N_m+1, which is the slot index immediately following the last middle slot among the middle slots, is determined as the last slot.

2. Assuming that only the first slot and the last slot are two adjacent/consecutive slots by excluding the middle slots, sub-slot duration PUSCHs of the duration D are repeatedly mapped R times such that the PUSCHs are adjacent to each other (over the two slots), starting from the symbol index S in the first slot.

a. In this case, the slot-filling method may be applied to repetition/mapping of the sub-slot duration PUSCHs of the duration D which spans the corresponding first slot and the last slot. For example, the first slot and the last slot of Opt 2 may be replaced with the first slot and the middle slot in the slot-filling method of Opt 1, respectively.

II. Step 2

1. For the first slot in the slot set, one or more L sub-slot duration PUSCH resources mapped to the corresponding first slot are determined as L individual/independent PUSCH resources, respectively.

III. Step 3

1. For the last slot in the slot set, one or more M sub-slot duration PUSCH resources mapped to the corresponding last slot are merged into one and determined as a single PUSCH resource having a symbol duration of {M×D}.

IV. Step 4

1. For the middle slot in the slot set, a single PUSCH resource having the slot duration is allocated to each slot.

3) Opt 3

A. DCI Signaling for PUSCH Scheduling i. The DCI may indicate 1) a first slot index K where PUSCH transmissions/resources are indicated, 2) an in-slot starting symbol index S and a symbol duration D of the first sub-slot duration PUSCH resource in the corresponding first slot, 3) the number of middle slots to which slot duration PUSCH resources are allocated N_m or the total number of slots to which PUSCH resources are allocated N_s (in this case, it is assumed that N_m=N_s−2), and 4) a (in-slot) last symbol index E of the PUSCH resource allocated to the last slot.

B. Determination of PUSCH Resources

I. Step 1

1. To configure a slot set, consecutive N_m slots are determined as middle slots starting from K+1, which is the slot index immediately following the first slot, and K+N_m+1, which is the slot index immediately following the last middle slot among the middle slots, is determined as the last slot.

2. One or more (L) sub-slot duration PUSCHs of the duration D are repeatedly mapped L times such that the PUSCHs are adjacent to each other, starting from the symbol index S in the first slot (to the in-slot last symbol only in the first slot).

a. In this case, the slot-filling method may be applied to repetition/mapping of the sub-slot duration PUSCHs of the duration D in the corresponding first slot.

II. Step 2

1. For the first slot in the slot set, one or more L sub-slot duration PUSCH resources mapped to the corresponding first slot are determined as L individual/independent PUSCH resources, respectively.

III. Step 3

1. For the last slot in the slot set, a single PUSCH resource having a duration from the first symbol index in the corresponding slot to the indicated symbol index E is allocated.

a. In 1 of Step 3, the symbol index E may be indicated as one of the following: 1) a symbol index S+O1 obtained by applying a symbol offset O1 to the symbol index S, 2) a symbol index S+D+O2 obtained by applying a symbol offset O2 to a symbol index S+D, 3) a symbol index D+O3 obtained by applying a symbol offset O3 to a symbol index D, and 4) a symbol index L+O4 obtained by applying a symbol offset O4 to a last symbol index L in the slot. Alternatively, the symbol index E may be determined as one of the symbol indices without separate signaling.

i. In 1-a of Step 3, the symbol offsets O1, O2, O3, and O4 may be set to positive and/or negative integer values including "0".

ii. For example, the symbol index E may be indicated as one of the following: 1) the symbol index S, 2) the symbol index S+D, 3) the symbol index D, and 4) the symbol index L. Alternatively, the symbol index E may be determined as one of the symbol indices without separate signaling.

iii. As another example, the symbol index E may be indicated as one of the following: 1) the symbol index S, 2) a symbol index S−1, 3) a symbol index S+D−1, 4) the last symbol index in the slot, 5) a symbol index S+D−2, 6) a symbol index S+1, and/or 7) the symbol index S+D. Alternatively, the symbol index E may be determined as one of the symbol indices without separate signaling.

IV. Step 4

For the middle slot in the slot set, a single PUSCH resource having the slot duration is allocated to each slot.

4) Opt 4

A. DCI Signaling for PUSCH Scheduling i. The DCI may indicate 1) a first slot index K where PUSCH transmissions/resources are indicated, 2) an in-slot starting symbol index S and a symbol duration D of the first sub-slot duration PUSCH resource in the corresponding first slot, 3) the total number of allocated (individual) PUSCH resources Np, and 4) a (in-slot) last symbol index E of the PUSCH resource allocated to the last slot.

B. Determination of PUSCH Resources

I. Step 1

1. One or more (L) sub-slot duration PUSCHs of the duration D are repeatedly mapped L times such that the PUSCHs are adjacent to each other, starting from the symbol index S in the first slot (to the in-slot last symbol only in the first slot).

a. In this case, the slot-filling method may be applied to repetition/mapping of the sub-slot duration PUSCHs of the duration D in the corresponding first slot.

2. To configure a slot set, consecutive Np_L−1 slots are determined as middle slots starting from K+1, which is the slot index immediately following the first slot, and K+N_p−L, which is the slot index immediately following the last middle slot among the middle slots, is determined as the last slot.

II. Step 2

1. For the first slot in the slot set, one or more L sub-slot duration PUSCH resources mapped to the corresponding first slot are determined as L individual/independent PUSCH resources, respectively.

III. Step 3

1. For the last slot in the slot set, a single PUSCH resource having a duration from the first symbol index in the corresponding last slot to the indicated symbol index E is allocated.

a. In 1 of Step 3, the symbol index E may be indicated as one of the following: 1) a symbol index S+O1 obtained by applying a symbol offset O1 to the symbol index S, 2) a symbol index S+D+O2 obtained by applying a symbol offset O2 to a symbol index S+D, 3) a symbol index D+O3 obtained by applying a symbol offset O3 to a symbol index D, and 4) a symbol index L+O4 obtained by applying a symbol offset O4 to a last symbol index L in the slot. Alternatively, the symbol index E may be determined as one of the symbol indices without separate signaling.

i. In 1-a of Step 3, the symbol offsets O1, O2, O3, and O4 may be set to positive and/or negative integer values including "0".

ii. For example, the symbol index E may be indicated as one of the following: 1) the symbol index S, 2) the symbol index S+D, 3) the symbol index D, and 4) the symbol index L. Alternatively, the symbol index E may be determined as one of the symbol indices without separate signaling.

iii. As another example, the symbol index E may be indicated as one of the following: 1) the symbol index S, 2) a symbol index S−1, 3) a symbol index S+D−1, 4) the last symbol index in the slot, 5) a symbol index S+D−2, 6) a symbol index S+1, and/or 7) the symbol index S+D. Alternatively, the symbol index E may be determined as one of the symbol indices without separate signaling.

IV. Step 4

1. For the middle slot in the slot set, a single PUSCH resource having the slot duration is allocated to each slot.

5) Opt 5

A. DCI Signaling for PUSCH Scheduling i. The DCI may indicate 1) a first slot index K where PUSCH transmissions/resources are indicated, 2) an in-slot starting symbol index S and a symbol duration D of the first sub-slot duration PUSCH resource in the corresponding first slot, 3) the number of repetitions of the corresponding sub-slot duration PUSCH resource R, and 4) the total number of allocated (individual) PUSCH resources N_p.

B. Determination of PUSCH Resources

I. Step 1

1. One or more (L) sub-slot duration PUSCHs of the duration D are repeatedly mapped L times such that the PUSCHs are adjacent to each other, starting from the symbol index S in the first slot (to the in-slot last symbol only in the first slot).

a. In this case, the slot-filling method may be applied to repetition/mapping of the sub-slot duration PUSCHs of the duration D in the corresponding first slot.

2. To configure a slot set, consecutive N_p−L−1 slots are determined as middle slots starting from K+1, which is the slot index immediately following the first slot, and K+N_p−L, which is the slot index immediately following the last middle slot among the middle slots, is determined as the last slot.

3. (R−L) sub-slot duration PUSCHs of the duration D are repeatedly mapped R-L times so that the PUSCHs are adjacent to each other, starting from the first symbol index in the last slot.

II. Step 2

1. For the first slot in the slot set, one or more L sub-slot duration PUSCH resources mapped to the corresponding first slot are determined as L individual/independent PUSCH resources, respectively.

III. Step 3

1. For the last slot in the slot set, one or more R-L sub-slot duration PUSCH resources mapped to the last slot are merged into one and determined as a single PUSCH having a symbol duration of {(R−L)×D}.

IV. Step 4

1. For the middle slot in the slot set, a single PUSCH resource having the slot duration is allocated to each slot.

6) Opt 6

A. DCI Signaling for PUSCH Scheduling

The DCI may indicate 1) a first slot index K where PUSCH transmissions/resources are indicated, 2) an in-slot starting symbol index S of the first PUSCH resource in the first slot and an in-slot last symbol index E of the PUSCH resource in the last slot, 3) the total number of allocated (individual) PUSCH resources N_p, and 4) the total number of slots to which PUSCH resources are allocated N_s and/or the number of middle slots to which PUSCH resources are allocated N_m.

B. Determination of PUSCH Resources

I. Step 1

1. When the total number of symbols from the symbol index S in the first slot to the last symbol index in the first slot is defined as X, it is configured that L=N_p−(N_s−1)=Np−(N_m+1) and duration D=X/L (or floor (X/L) or ceiling (X/L)).

2. Sub-slot duration PUSCHs of the duration D are repeatedly mapped L times so that the PUSCHs are adjacent to each other, starting from the symbol index S in the first slot (to the in-slot last symbol only in the first slot).

a. In this case, the slot-filling method may be applied to repetition/mapping of the sub-slot duration PUSCHs of the duration D in the corresponding first slot.

3. To configure a slot set, consecutive N_p−L−1 slots are determined as middle slots starting from K+1, which is the slot index immediately following the first slot, and K+N_p−L, which is the slot index immediately following the last middle slot among the middle slots, is determined as the last slot.

II. Step 2

1. For the first slot in the slot set, one or more L sub-slot duration PUSCH resources mapped to the corresponding first slot are determined as L individual/independent PUSCH resources, respectively.

III. Step 3

1. For the last slot in the slot set, a single PUSCH resource having a duration from the first symbol index in the corresponding last slot to the indicated symbol index E is allocated.

a. In 1 of Step 3, the symbol index E may be indicated as one of the following: 1) a symbol index S+O1 obtained by applying a symbol offset O1 to the symbol index S and 2) a symbol index L+O2 obtained by applying a symbol offset O2 to a last symbol index L in the slot. Alternatively, the symbol index E may be determined as one of the symbol indices without separate signaling.

i. In 1-a of Step 3, the symbol offsets O1 and O2 may be set to positive and/or negative integer values including "0".

ii. For example, the symbol index E may be indicated as one of the following: 1) the symbol index S and 2) the symbol index L. Alternatively, the symbol index E may be determined as one of the symbol indices without separate signaling.

iii. As another example, the symbol index E may be indicated as one of the following: 1) a symbol index S−1, 2) the last symbol index in the slot, 3) the symbol index S, and/or 4) a symbol index S+1. Alternatively, the symbol index E may be determined as one of the symbol indices without separate signaling.

b. As another method, the symbol index E may be indicated as one of the following: 1) a symbol index S+O1 obtained by applying a symbol offset O1 to the symbol index S, 2) a symbol index S+D+O2 obtained by applying a symbol offset O2 to a symbol index S+D, 3) a symbol index D+O3 obtained by applying a symbol offset O3 to a symbol index D, and 4) a symbol index L+O4 obtained by applying a symbol offset O4 to a last symbol index L in the slot. Alternatively, the symbol index E may be determined as one of the symbol indices without separate signaling.

i. In 1-b of Step 3, the symbol offsets O1, O2, O3, and O4 may be set to positive and/or negative integer values including "0".

ii. For example, the symbol index E may be indicated as one of the following: 1) the symbol index S, 2) the symbol index S+D, 3) the symbol index D, and 4) the symbol index L. Alternatively, the symbol index E may be determined as one of the symbol indices without separate signaling.

iii. As another example, the symbol index E may be indicated as one of the following: 1) the symbol index S, 2) a symbol index S−1, 3) a symbol index S+D−1, 4) the last symbol index in the slot, 5) a symbol index S+D−2, 6) a symbol index S+1, and/or 7) the symbol index S+D. Alternatively, the symbol index E may be determined as one of the symbol indices without separate signaling.

IV. Step 4

1. For the middle slot in the slot set, a single PUSCH resource having the slot duration is allocated to each slot.

7) Data Mapping and DMRS Pattern

A. Data Mapping Type i. In Embodiment 1, independent (or different) data mapping types may be configured for the first slot and the remaining slots.

1. For example, data mapping type B may be configured for a PUSCH allocated to the first slot, whereas data mapping type A (or B) may be configured for PUSCHs allocated to the middle slot and the last slot.

ii. Alternatively, independent (or different) data mapping types may be configured for the middle slot and the remaining slots.

1. For example, data mapping type A (or B) may be configured for a PUSCH allocated to the middle slot, whereas data mapping type B may be configured for PUSCHs allocated to the first slot and the last slot.

iii. Alternatively, independent data mapping types may be configured for the first slot, the middle slot, and the last slot.

1. For example, data mapping type B may be configured for a PUSCH allocated to the first slot, data mapping type A (or B) may be configured for a PUSCH allocated to the middle slot, and data mapping type A or B may be configured for a PUSCH allocated to the last slot.

B. DMRS (Symbol) Pattern i. In Embodiment 1, independent (or different) DMRS patterns (e.g., the number of DMRS symbols) may be configured for the first slot and the remaining slots.

1. For example, X DMRS symbols may be configured for a PUSCH allocated to the first slot, whereas Y (or X) DMRS symbols may be configured for PUSCHs allocated to the middle slot and the last slot (e.g., X<Y).

ii. Alternatively, independent (or different) DMRS patterns (e.g., the number of DMRS symbols) may be configured for the middle slot and the remaining slots.

1. For example, Y (or X) DMRS symbols may be configured for a PUSCH allocated to the middle slot, whereas X DMRS symbols may be configured for PUSCHs allocated to the first slot and the last slot (e.g., X<Y).

iii. Alternatively, independent DMRS patterns (the number of DMRS symbols) may be configured for the first slot, the middle slot, and the last slot.

1. For example, X DMRS symbols may be configured for a PUSCH allocated to the first slot, Y (or X) DMRS symbols may be configured for a PUSCH allocated to the middle slot, and X or Y DMRS symbols may be configured for a PUSCH allocated to the last slot (e.g., X<Y).

(2) Embodiment 2

Embodiment 2 proposes a scheduling method where one DCI indicates a plurality of PUSCH transmission resources over a plurality of slot sets. Specifically, according to the scheduling method, 1) one sub-slot (or slot) duration PUSCH resource is allocated to the first slot in the corresponding slot set, 2) one sub-slot (or slot) duration PUSCH resource is allocated to the last slot, and 3) a slot duration PUSCH resource is allocated to each of the remaining middle slot(s).

One fixed starting symbol may be configured for the single sub-slot (or slot) duration PUSCH resource allocated to the first slot. Alternatively, a plurality of candidate starting symbol sets may be configured for the corresponding PUSCH resource by considering LBT operation of the UE required for UL transmission (UL transmission disabled due to CCA failure). More specifically, the following DCI signaling and PUSCH resource determination method (for the UE) may be considered in Embodiment 2.

1) Opt 1
A. DCI Signaling for PUSCH Scheduling
   i. The DCI may indicate 1) a first slot index K where PUSCH transmissions/resources are indicated, 2) an in-slot starting symbol index S and a symbol duration D of the first sub-slot duration PUSCH resource in the corresponding first slot, and 3) the number of repetitions of the corresponding sub-slot duration PUSCH resource R.
B. Determination of PUSCH Resources
I. Step 1
   1. The sub-slot duration PUSCH of the duration D is repeatedly mapped R times to be adjacent to each other (over a plurality of slots), starting from the symbol index S in the first slot. A plurality of slots to which at least one sub-slot duration PUSCH resource is mapped are grouped into a slot set (the following symbol processing method is referred to as a "slot-filling" method for convenience).
   a. In Step 1 (for example, for the first slot), if the duration D (the number of corresponding symbols) is not a divisor of a duration X (the number of symbols in the duration X) from the symbol index S to the last symbol of the slot, 1) the sub-slot duration PUSCH may be repeated/mapped the maximum number of durations D in the duration X, and the sub-slot duration PUSCH may be repeated/mapped continuously by switching to the next slot (from the first symbol in the corresponding slot), or 2) the sub-slot duration PUSCH of the duration D may be repeated/mapped over consecutive symbols while slot boundaries are ignored.
     i. Assuming that the number of sub-slot duration PUSCHs of the duration D repeated/mapped in a slot (which is a complete form and not a partial form) is L, the length of the last sub-slot duration PUSCH in the (first) slot (or the number of symbols) may be determined/assigned as/to $\{X-D(L-1)\}$ (which is greater than D).
   b. (For example, for the middle slot), if the duration D (the number of corresponding symbols) is not a divisor of the slot duration (the number of corresponding symbols), 1) the sub-slot duration PUSCH may be repeated/mapped the maximum number of durations D within the slot duration, and the sub-slot duration PUSCH may be repeated/mapped continuously by changing to the next slot (from the first symbol in the slot), or 2) the sub-slot duration PUSCH of the duration D may be repeated/mapped over consecutive symbols while slot boundaries are ignored.
II. Step 2
   1. For the first slot in the slot set, one or more L sub-slot duration PUSCH resources mapped to the corresponding slot are merged into one and determined as a single PUSCH resource having a symbol length of $\{L \times D\}$.

2. In Step 2, the PUSCH starting symbols of the L sub-slot duration PUSCH resources may be set to a plurality of candidate starting symbol sets for the corresponding single (merged) PUSCH resource.
III. Step 3
   1. For the last slot in the slot set, one or more M sub-slot duration PUSCH resources mapped to the corresponding last slot are merged into one and determined as a single PUSCH resource having a symbol duration of $\{M \times D\}$.
IV. Step 4
   1. For the middle slot in the slot set, a plurality of N sub-slot duration PUSCH resources mapped to each middle slot are merged into one and determined as a single PUSCH resource having a symbol duration or slot duration of $\{N \times D\}$.

2) Opt 2
A. DCI Signaling for PUSCH Scheduling
   i. The DCI may indicate 1) a first slot index K where PUSCH transmissions/resources are indicated, 2) an in-slot starting symbol index S and a symbol duration D of the first sub-slot duration PUSCH resource in the corresponding first slot, 3) the number of repetitions of the corresponding sub-slot duration PUSCH resource R, and 4) the number of middle slots to which slot duration PUSCH resources are allocated N_m and/or the total number of slots to which PUSCH resources are allocated N_s (in this case, it is assumed that N_m=N_s−2).
B. Determination of PUSCH Resources
I. Step 1
   1. To configure a slot set, consecutive N_m slots are determined as middle slots starting from K+1, which is the slot index immediately following the first slot, and K+N_m+1, which is the slot index immediately following the last middle slot among the middle slots, is determined as the last slot.
   2. Assuming that only the first slot and the last slot are two adjacent/consecutive slots by excluding the middle slots, sub-slot duration PUSCHs of the duration D are repeatedly mapped R times such that the PUSCHs are adjacent to each other (over the two slots), starting from the symbol index S in the first slot.
   a. In this case, the slot-filling method may be applied to repetition/mapping of the sub-slot duration PUSCHs of the duration D which spans the corresponding first slot and the last slot. For example, the first slot and the last slot of Opt 2 may be replaced with the first slot and the middle slot in the slot-filling method of Opt 1, respectively.
II. Step 2
   1. For the first slot in the slot set, one or more L sub-slot duration PUSCH resources mapped to the corresponding first slot are merged into one and determined as a single PUSCH resource having a symbol duration of $\{L \times D\}$.
   2. In Step 2, the PUSCH starting symbols of the L sub-slot duration PUSCH resources may be set to a plurality of candidate starting symbol sets for the corresponding single (merged) PUSCH resource.
III. Step 3
   1. For the last slot in the slot set, one or more M sub-slot duration PUSCH resources mapped to the corresponding last slot are merged into one and determined as a single PUSCH resource having a symbol duration of $\{M \times D\}$.
IV. Step 4
   1. For the middle slot in the slot set, a single PUSCH resource having the slot duration is allocated to each middle slot.

3) Opt 3
A. DCI Signaling for PUSCH Scheduling
  i. The DCI may indicate 1) a first slot index K where PUSCH transmissions/resources are indicated, 2) an in-slot starting symbol index S and a symbol duration D of the first sub-slot duration PUSCH resource in the corresponding first slot, 3) the number of middle slots to which slot duration PUSCH resources are allocated N_m and/or the total number of slots to which PUSCH resources are allocated N_s (in this case, it is assumed that N_m=N_s−2), and 4) a (in-slot) last symbol index E of the PUSCH resource allocated to the last slot.
B. Determination of PUSCH Resources
I. Step 1
  1. To configure a slot set, consecutive N_m slots are determined as middle slots starting from K+1, which is the slot index immediately following the first slot, and K+N_m+1, which is the slot index immediately following the last middle slot among the middle slots, is determined as the last slot.
  2. One or more (L) sub-slot duration PUSCHs of the duration D are repeatedly mapped L times such that the PUSCHs are adjacent to each other, starting from the symbol index S in the first slot (to the in-slot last symbol only in the first slot).
    a. In this case, the slot-filling method may be applied to repetition/mapping of the sub-slot duration PUSCHs of the duration D in the first slot.
II. Step 2
  1. For the first slot in the slot set, one or more L sub-slot duration PUSCH resources mapped to the corresponding first slot are merged into one and determined as a single PUSCH resource having a symbol duration of {L×D}.
  2. In Step 2, the PUSCH starting symbols of the L sub-slot duration PUSCH resources may be set to a plurality of candidate starting symbol sets for the corresponding single (merged) PUSCH resource.
III. Step 3
  1. For the last slot in the slot set, a single PUSCH resource having a duration from the first symbol index in the corresponding last slot to the indicated symbol index E is allocated.
    a. In 1 of Step 3, the symbol index E may be indicated as one of the following: 1) a symbol index S+O1 obtained by applying a symbol offset O1 to the symbol index S, 2) a symbol index S+D+O2 obtained by applying a symbol offset O2 to a symbol index S+D, 3) a symbol index D+O3 obtained by applying a symbol offset O3 to a symbol index D, and 4) a symbol indexes L+O4 obtained by applying a symbol offset O4 to a last symbol index L in the slot. Alternatively, the symbol index E may be determined as one of the symbol indices without separate signaling.
      i. In 1-a of Step 3, the symbol offsets O1, O2, O3, and O4 may be set to positive and/or negative integer values including "0".
    ii. For example, the symbol index E may be indicated as one of the following: 1) the symbol index S, 2) the symbol index S+D, 3) the symbol index D, and 4) the symbol index L. Alternatively, the symbol index E may be determined as one of the symbol indices without separate signaling.
    iii. As another example, the symbol index E may be indicated as one of the following: 1) the symbol index S, 2) a symbol index S−1, 3) a symbol index S+D−1, 4) the last symbol index in the slot, 5) a symbol index S+D−2, 6) a symbol index S+1, and/or 7) the symbol index S+D. Alternatively, the symbol index E may be determined as one of the symbol indices without separate signaling.

IV. Step 4
  1. For the middle slot in the slot set, a single PUSCH resource having the slot duration is allocated to each slot.
4) Data Mapping and DMRS Pattern
A. Data Mapping Type
  i. In Embodiment 2, independent (or different) data mapping types may be configured for the first slot and the remaining slots.
    1. For example, data mapping type B may be configured for a PUSCH allocated to the first slot, whereas data mapping type A (or B) may be configured for PUSCHs allocated to the middle slot and the last slot.
  ii. Alternatively, independent (or different) data mapping types may be configured for the middle slot and the remaining slots.
    1. For example, data mapping type A (or B) may be configured for a PUSCH allocated to the middle slot, whereas data mapping type B may be configured for PUSCHs allocated to the first slot and the last slot.
  iii. Alternatively, independent (or different) data mapping types may be configured for the last slot and the remaining slots.
    1. For example, data mapping type B may be configured for a PUSCH allocated to the last slot, whereas data mapping type A (or B) may be configured for PUSCHs allocated to the first slot and the middle slot.
  iv. Alternatively, independent data mapping types may be configured for the first slot, the middle slot, and the last slot.
    1. For example, data mapping type B may be configured for a PUSCH allocated to the first slot, data mapping type A (or B) may be configured for a PUSCH allocated to the middle slot, and data mapping type A or B may be configured for a PUSCH allocated to the last slot.
B. DMRS (Symbol) Pattern
  i. In Embodiment 2, independent (or different) DMRS patterns (e.g., the number of DMRS symbols) may be configured for the first slot and the remaining slots.
    1. For example, X DMRS symbols may be configured for a PUSCH allocated to the first slot, whereas Y (or X) DMRS symbols may be configured for PUSCHs allocated to the middle slot and the last slot (e.g., X<Y).
  ii. Alternatively, independent (or different) DMRS patterns (e.g., the number of DMRS symbols) may be configured for the middle slot and the remaining slots.
    1. For example, Y (or X) DMRS symbols may be configured for a PUSCH allocated to the middle slot, whereas X DMRS symbols may be configured for PUSCHs allocated to the first slot and the last slot (e.g., X<Y).
  iii. Alternatively, independent (or different) DMRS patterns (the number of DMRS symbols) may be configured for the last slot and the remaining slots.
    1. For example, X DMRS symbols may be configured for a PUSCH allocated to the last slot, whereas Y (or X) DMRS symbols may be configured for PUSCHs allocated to the first slot and the middle slot (e.g., X<Y).
  iv. Alternatively, independent DMRS patterns (the number of DMRS symbols) may be configured for the first slot, the middle slot, and the last slot.
    1. For example, X DMRS symbols may be configured for a PUSCH allocated to the first slot, Y (or X) DMRS symbols may be configured for a PUSCH allocated to the middle slot, and X or Y DMRS symbols may be configured for a PUSCH allocated to the last slot (e.g., X<Y).

Additionally, the following methods may be considered to indicate data mapping types applied to PUSCH transmissions/resources in the first/middle/last slots scheduled/allocated by a single multi-slot DCI.

1) Method 1
   A. For the first-slot PUSCH, one fixed data mapping type (e.g., B) is applied.
   B. Two data mapping types to be respectively applied to the middle slot and the last slot are indicated by a single DCI.
2) Method 2
   A. For the last-slot PUSCH, one fixed data mapping type (e.g., B) is applied.
   B. Two data mapping types to be respectively applied to the first slot and the middle slot are indicated by a single DCI.
3) Method 3
   A. For the middle-slot PUSCH, one fixed data mapping type (e.g., A or B) is applied.
   B. Two data mapping types to be respectively applied to the first slot and the last slot are indicated by a single DCI.
4) Method 4
   A. Three data mapping types to be respectively applied to the first, middle, and last slots are indicated by a single DCI.

(3) Embodiment 3

In the case of conventional DCI scheduling a single PUSCH transmission in one slot (such DCI is referred to as "single-slot DCI" for convenience), SRS transmission at a specific time may be indicated by an aperiodic SRS (a-SRS) request field in the corresponding DCI. Specifically, one SRS resource set (or multiple SRS resource set in carrier aggregation (CA)) and a (DCI-to-SRS) slot offset (K_s) indicating the SRS transmission time may be configured (independently) for each state signaled by the corresponding a-SRS request field/bit. Here, one SRS resource set may include one or a plurality of SRS resources (consecutive or nonconsecutive in the time domain), and one SRS resource may include one or a plurality of SRS symbols (consecutive in the time domain).

On the other hand, in the case of DCI scheduling/indicating multiple PUSCH transmission resources over a plurality of slots as described above (for convenience, such DCI is referred to as "multi-slot DCI"), if a (DCI-to-PUSCH) slot offset indicated by the DCI for a (first) PUSCH transmission time is defined as K, the transmission time (slot) of a (SRS) resource set indicated by an a-SRS request field in the corresponding DCI, that is, a DCI-to-SRS slot offset is determined as the maximum value of K and K_s, i.e., max(K, K_s) or {K+K_s}, which is the sum of K and K_s. Alternatively, if the total number of slots in which PUSCH transmissions (resources) are scheduled/indicated is defined as N_s, the DCI-to-SRS slot offset may be determined as {K+K_s mod N_s}, {min (K+K_s, K+N_s−1)}, or {min (max (K, K_s), K+N_s−1)}.

In addition, if an SRS resource (or SRS resource set) where transmission is indicated by the multi-slot DCI overlaps in time with the entirety of a specific PUSCH resource (or a DMRS symbol of the corresponding PUSCH) scheduled by the corresponding multi-slot DCI, the corresponding PUSCH transmission may be dropped. Additionally, if the SRS resource (or SRS resource set) indicated/scheduled by the multi-slot DCI overlaps with a part of the specific PUSCH resource (not including the DMRS symbol or including the DMRS symbol), the corresponding PUSCH (resource) may be transmitted after performing rate-matching or puncturing on overlapping symbols.

As another method, when the multi-slot DCI indicates SRS transmission in an SRS resource set consisting of a plurality of (M) SRS symbols, the transmission position of the corresponding SRS (resource set) in a slot determined as the corresponding SRS transmission time may be determined/changed to the first or last M symbols (consecutive in the time domain). In this case, the positions of the corresponding symbols may be different from the positions of M SRS symbols included in the SRS resource set originally configured by RRC signaling (used to indicate a-SRS transmission by the single-slot DCI).

On the other hand, in the case of conventional PUSCH scheduling based on the single-slot DCI, CSI feedback transmission at a specific time may be indicated by an aperiodic CSI (a-CSI) request field in the corresponding DCI. Specifically, one CSI reporting set (or multiple CSI reporting sets in CA) and a (DCI-to-CSI) slot offset (K_c) indicating the transmission time of a PUSCH (for convenience, such a PUSCH is referred to as "a-CSI only PUSCH") carrying only a-CSI feedback with no uplink shared channel (UL-SCH) may be configured (independently) for each state signaled by the corresponding a-CSI request field/bit. In this case, the transmission time of a PUSCH in which the a-CSI feedback is indicated together with a UL-SCH may be determined as the slot indicated by K, and the transmission time of the a-CSI only PUSCH may be determined as the slot indicated by K_c. Whether the UL-SCH is included in the PUSCH may be indicated by a UL-SCH indicator field in the corresponding DCI.

On the other hand, in the case of multiple PUSCH scheduling based on the multi-slot DCI, when it is indicated by a UL-SCH indicator in the corresponding DCI that "UL-SCH is included" (and "a-CSI is included"), all of a plurality of PUSCH resources scheduled by the corresponding DCI may be transmitted in the form of a PUSCH including the UL-SCH, and among the PUSCH resources, one specific PUSCH resource (including the UL-SCH) may be transmitted in the form of a PUSCH carrying the a-CSI feedback. In particular, when it is indicated by the multi-slot DCI that "there is no UL-SCH" (and "a-CSI is included"), a specific one PUSCH resource among the plurality of PUSCH resources scheduled by the corresponding DCI may be transmitted in the form of an a-CSI only PUSCH (with no UL-SCH), and the remaining PUSCH resources may be transmitted in the form of a PUSCH including the UL-SCH (with no a-CSI).

The first time point (slot) to which a plurality of PUSCH transmission resources (or the first PUSCH resource thereamong) scheduled/indicated by the multi-slot DCI are allocated (over a plurality of slots), that is, the DCI-to-PUSCH slot offset may be indicated/determined as follows: 1) the DCI-to-PUSCH slot offset may be indicated/determined based on the value of K (for example, as the same value as K) if the corresponding DCI indicates that "UL-SCH is included" (and "a-CSI is included"); and 2) the DCI-to-PUSCH slot offset may be indicated/determined based on the value of K_c (for example, as the same value as K_c) if the corresponding DCI indicates that "there is no UL-SCH" (and "a-CSI is included"). For example, if the DCI indicates that "there is no UL-SCH" (and "a-CSI is included"), the DCI-to-PUSCH slot offset may be indicated/determined as K_c−1. In this case, a PUSCH transmission resource carrying only CSI feedback with no UL-SCH (or a slot to which the resource is allocated) may be indicated/determined according to the offset value of K_c. As another example, when the DCI indicates that "UL-SCH is included" (and "a-CSI is included"), the DCI-to-PUSCH slot offset may be indicated/determined as K−1. In this case, a PUSCH transmission resource carrying CSI feedback (including the UL- SCH) (or a slot to which the resource is allocated) may be indicated/determined according to the offset value of K.

A PUSCH transmission resource carrying CSI (reporting set) feedback indicated by the a-CSI request field in the multi-slot DCI may be determined as: Opt 1) a first PUSCH resource allocated by the corresponding DCI; Opt 2) a PUSCH resource allocated in the first slot in which PUSCH transmission is indicated (in this case, when there are a plurality of sub-slot duration PUSCH resources allocated according to the proposed method, if CSI feedback transmission is indicated by DCI, a plurality of PUSCH resources are exceptionally merged and determined as a single PUSCH resource, and if no CSI feedback transmission is indicated, the plurality of PUSCH resources are determined as individual PUSCH resources); Opt 3) a first PUSCH resource including a specific number of symbols (or non-DMRS symbols) or more and/or a specific number of RBs (REs or non-DMRS REs) or more; or Opt 4) a PUSCH resource allocated in the slot immediately following the first slot in which PUSCH transmission is indicated. In this case, one of Options 1, 2, 3, and 4 may be applied depending on whether "with UL-SCH" or "without UL-SCH" is indicated by the DCI.

As another method, the transmission time (slot) of a PUSCH carrying CSI (reporting set) feedback indicated by the a-CSI request field in the multi-slot DCI (e.g., an a-CSI only PUSCH and/or a PUSCH including a UL-SCH and carrying a-CSI feedback), that is, a DCI-to-CSI (PUSCH) slot offset may be determined as follows: K_c; max(K, K_c) which is the maximum value of K and K_c; or {K+K_c} which is the sum of K and K_c. Alternatively, if the total number of slots in which PUSCH transmissions (resources) are scheduled/indicated is defined as N_s, the DCI-to-SRS (PUSCH) slot offset may be determined as {K+K_c mod N_s}, {min (K+K_c, K+N_s−1)}, or {min (max (K, K_c), K+N_s−1)}. In this case, both K and K_c may be signaled/indicated by the same field in the DCI.

(4) Embodiment 4

Unlike the legacy LTE system that supports only transmission/retransmission scheduling on a TB basis, the NR system supports that for DL/UL data transmission/scheduling, transmission/retransmission scheduling is performed on a codeblock group (CBG) basis by configuring a plurality of (e.g., M) CBGs constituting a single TB for the purpose of efficient resource use (for example, the index of a CBG where (re)transmission is scheduled is indicated by an M-bit CBG transmission indicator (CBGTI) field in DCI). On the other hand, multiple PUSCH scheduling based on the multi-slot DCI may also be considered for CCs in which (re)transmission is configured on a CBG basis. If the CBGTI field/signaling is configured separately for each of a plurality of scheduled PUSCHs (or TBs), the DCI payload size may increase, and as a result, overhead may increase.

Thus, only when a single PUSCH (or TB) is scheduled by the multi-slot DCI, the CBGTI field/signaling (related to the single PUSCH (or TB)) may be configured in the corresponding DCI. When a plurality of PUSCHs (or TBs) are scheduled by the multi-slot DCI, only (re)transmission on a TB basis may be performed for the plurality of PUSCHs (or TBs), instead of configuring the CBGTI field/signaling in the DCI. Considering the structure in which the presence or absence of the CBGTI field/signaling is determined depending on to the number of scheduled PUSCHs (or TBs) scheduled, a method of determining the payload size of the multi-slot DCI (format) may be required. The reason for this is as follows: a single PUSCH and a plurality of PUSCHs may be scheduled by the same DCI format (e.g., DCI format 0_1); if the payload size of DCI scheduling a single PUSCH is different from that of DCI scheduling a plurality of PUSCHs, the UE needs to attempt blind decoding by assuming that there are two types of DCI payload sizes; and as the number of DCI payload size related assumptions increases, the number of times of blind decoding increases, which may decrease DCI decoding performance. On the other hand, if the DCI payload size is always fixed to the largest possible size, overhead may increase more than necessary. Accordingly, the following methods may be considered. For convenience of description, some parameters are defined as follows.

N: N denotes the maximum number of PUSCHs (or TBs) schedulable by a single multi-slot DCI. N may be set by the RRC parameter pusch-TimeDomainAllocationList. The maximum number of schedulable PUSCHs may be set to, for example, one integer value from 2 to 8 (2≤N≤8, where N is an integer).

K: K denotes the number of PUSCHs (or TBs) actually scheduled by a single multi-slot DCI.

M: M denotes the maximum number of CBGs per PUSCH (or TB) configured for a single CC or the number of bits included in a single CBGTI field related to the number of CBGs. The maximum number of CBGs per PUSCH (or TB) configured for the single CC may be set by the RRC parameter maxCodeBlockGroupsPerTransportBlock. For example, the maximum number of CBGs per PUSCH (or TB) configured for the single CC may be set to 2, 4, 6 or 8.

O: O denotes the number of NDI field configuration bits indicated for each scheduled PUSCH (or TB) (e.g., 1) or the number of NDI field configuration bits indicated for each schedulable maximum PUSCH (or TB). For example, when the maximum number of scheduled or schedulable PUSCHs is set to 8, the value of O, i.e., the number of NDI field configuration bits for each PUSCH of the 8 PUSCHs may be 1. When the maximum number of scheduled or schedulable PUSCHs is 8 and O is 1, the total number of NDI field bits for the 8 PUSCHs may be 8*1=8.

O1: O1 denotes the number of redundancy version (RV) field bits (e.g., 1 or 2) indicated for a single PUSCH (or TB) when the corresponding PUSCH (or TB) is scheduled (e.g., 1 or 2). Preferably, the number of RV field bits (the value of O1) may be 2.

O2: O2 denotes the number of RV field configuration bits indicated for each PUSCH (or TB) when multiple PUSCHs (or TBs) are scheduled (e.g., 1) or the number of RV field configuration bits indicated for each schedulable maximum PUSCH (or TB). For example, when the maximum number of scheduled or schedulable PUSCHs is set to 8, the value of O2, the number of RV field configuration bits for each PUSCH of the 8 PUSCHs may be 1. When the maximum number of scheduled or schedulable PUSCHs is 8 and O2 is 1, the total number of RV field bits for the 8 PUSCHs may be 8*1=8.

P: P denotes the number of bits of a UL-SCH indicator field indicating whether a UL-SCH is included in a PUSCH (e.g., 1).

1) Determination of Number of Required DCI Configuration Bits (Overhead)

A. When only a single PUSCH (or TB) is scheduled by DCI and when a CBGTI field and/or signaling is configured in the DCI (e.g., K=1), DCI overhead 1 for determining the DCI payload size may be determined as follows: DCI overhead 1=M+O+O1. In addition, similarly to the CBGTI field, a UL-SCH indicator field may also be configured in the DCI only if a single PUSCH is scheduled by the DCI. In this case, DCI overhead 1 for determining the DCI payload size may be determined as follows: DCI overhead 1=M+O+O1+P.

B. When a maximum of N PUSCHs (or TBs) are scheduled and when a CBGTI field and/or signaling is not configured in the DCI (e.g., K=N, where N is plural), DCI overhead 2 for determining the DCI payload size may be determined as follows: DCI overhead 2=N*{O+O2}. In addition, similarly to the CBGTI field, a UL-SCH indicator field may also be configured in the DCI only if a single PUSCH is scheduled by the DCI. In this case, DCI overhead 2 for may also be determined as follows: DCI overhead 2=N*{O+O2}.

2) Determination of Multi-Slot DCI (Format) Payload Size

A. Method D-1 i. The DCI payload size may be determined based on/applying the larger value of DCI overhead 1 and DCI overhead 2. If the maximum number of PUSCHs schedulable by a single multi-slot DCI N and the maximum number of CBGs per PUSCH (or TB) configured for a single CC M are all set to 2 by each RRC parameter, DCI overhead 1 and DCI overhead 2 may be determined as follows: DCI overhead 1=2+1+2+1=6 bits (M=2, O=1, O1=2, and P=1), DCI overhead 2=2*(1+1)=4 bits (N=2, O=1, and O2=1). In this case, since DCI overhead 1 is larger, the DCI payload size may be determined based on DCI overhead 1 both when a single PUSCH is scheduled and when a plurality of PUSCHs are scheduled. When the DCI payload size is determined based on DCI overhead 1, if a plurality of PUSCHs are scheduled by the corresponding DCI, zero padding may be added to bits corresponding to DCI overhead 1–DCI overhead 2. If N is set to 6 by the RRC parameter and M is set to 4 by the RRC parameter, DCI overhead 1 and DCI overhead 2 may be determined as follows: DCI overhead 1=4+1+2+1=8 bits (M=4, O=1, O1=2, and P=1), DCI overhead 2=6*(1+1)=12 bits (N=6, O=1, and O2=1). In this case, since DCI overhead 2 is larger, the DCI payload size may be determined based on DCI overhead 2 both when a single PUSCH is scheduled and when a plurality of PUSCHs are scheduled. When the DCI payload size is determined based on DCI overhead 2, if a single PUSCH is scheduled by the corresponding DCI, zero padding may be added to bits corresponding to DCI overhead 2–DCI overhead 1. Accordingly, the DCI overhead that varies depending on the configurations of N and M values may be reflected in the system, and the UE may be guaranteed with constant decoding performance.

B. Method D-2 i. The DCI payload size may always be determined based on/applying DCI overhead 2. According to this method, when overhead 1>overhead 2, even if only a single PUSCH (or TB) is scheduled by the multi-slot DCI (e.g., K=1), (re)transmission may be performed on a TB basis without configuring the CBGTI field/signaling.

Since the DCI overhead is determined by considering parameters of which the number of bits may be changed by being affected by the number of scheduled PUSCHs among information and/or fields included in the DCI, the DCI payload size may be different from the size of DCI overhead 1 or 2.

On the other hand, when the payload size of the multi-slot DCI (format) is determined by applying/based on overhead 2 (e.g., N×{O+O2} bits) (due to overhead 2>overhead 1), the size of an unused portion of bits/payload corresponding to overhead 2 may vary depending on the difference between the actual number of scheduled PUSCHs (or TBs) K and N.

If the number of NDI and RV field configuration bits indicated by the actually scheduled K PUSCHs (or TBs) is defined as overhead 3=K×{O+O2} and the difference between overhead 2 and overhead 3 is defined as Gap=overhead 2–overhead 3, the CBGTI field may be configured/signaled as follows according to the size of Gap.

1) Method G-1

A. If Gap<M, no CBGTI field/signaling is configured.

B. If Gap>=M, a single CBGTI field/signaling is configured and the corresponding CBGTI is indicated/applied only to a specific PUSCH (or TB) (e.g., first PUSCH (or TB)).

2) Method G-2

A. If Gap<M, no CBGTI field/signaling is configured.

B. If (a×M)<=Gap<(b×M) (where, a>0 and b=a+1), a CBGTI fields are configured, the corresponding CBGTI is indicated/applied to a specific PUSCHs (or TBs) (for example, first PUSCH (or TB)).

i. Here, if a>=K, each CBGTI field may be configured/signaled to all of the K scheduled PUSCHs (or TBs).

(5) Embodiment 5

In the NR system, a plurality of (candidate) BWPs may be configured in the same serving cell. If the multi-slot PUSCH scheduling operation according to the embodiments of the present disclosure is configured in the corresponding cell, the maximum number of PUSCHs (or TBs) schedulable by a single DCI (or the number of transmission resources therefor) may be separately/independently configured for each BWP. Accordingly, the payload size of (dedicated) DCI corresponding to each BWP may be determined based on the maximum number of (schedulable) PUSCHs (or TBs) configured for the corresponding BWP, M. For example, the number of NDI and/or RV fields in the DCI may be set to M.

Thus, to dynamically change a (active) BWP based on the DCI in the above situation, handling may be required for switching between BWPs in which M is set to different values. Accordingly, when switching from BWP1 to BWP2 is indicated and the values of M for BWP1 and BWP2 are set to M1 and M2, respectively, if M1<M2, the following operations may be considered.

1) Option 1

A. The maximum number of PUSCHs (or TBs) schedulable by DCI (indicating BWP switching) may be limited to M1 (configured for BWP1).

B. Accordingly, the UE may operate on the assumption that scheduling for up to M1 PUSCHs (or TBs) is performed based on the corresponding DCI.

2) Option 2

A. The maximum number of PUSCHs (or TBs) schedulable by DCI (indicating BWP switching) may be supported up to M2 (configured for BWP2).

B. In this case, the RV for (all or some of) the scheduled PUSCHs (or TBs) may be fixed/applied to a specific value (e.g., 0), and the NDI value (for a specific PUSCH (or RB)) may be indicated by the RV field corresponding to the PUSCH (or TB).

i. The operation of B of Option 2 (the NDI is indicated by the RV field) may be applied only when the number of PUSCHs (or TBs) actually scheduled by DCI exceeds M1 (if the number of PUSCHs (or TBs) scheduled by the DCI is less than or equal to M1, the above operation may not be applied).

As another method, the maximum number of PUSCHs (or TBs) schedulable by a single DCI, M may be set to the same value for a plurality of BWPs configured in the same cell (where the multi-slot PUSCH scheduling operation is configured). Thus, the PUSCH scheduling restriction or limited RV application described above may not be applied.

As a further method, the value of M may be separately/independently configured for each BWP for a plurality of BWPs configured in the same cell (where the multi-slot PUSCH scheduling operation is configured). The payload size of (multi-slot PUSCH scheduling) DCI (e.g., the number of NDI and/or RV fields) may be determined based on the maximum value among the values of M configured for each BWP.

Implementation Example

Figure 11:
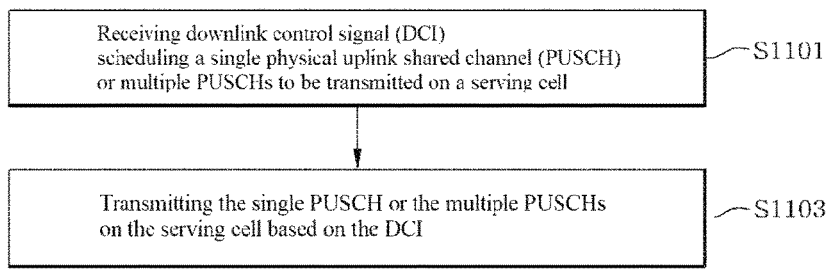
FIG. 11 is a diagram illustrating uplink (UL) channel transmission according to the embodiments of the present disclosure.

FIG. 11 is a flowchart illustrating a signal transmission/reception method according to embodiments of the present disclosure.

Referring to FIG. 11, the embodiments of the present disclosure may be performed by a UE. The embodiments of the present disclosure may include: receiving DCI scheduling a single PUSCH or multiple PUSCHs to be transmitted on a serving cell (S1101); and transmitting the single PUSCH or the multiple PUSCHs on the serving cell based on the DCI (S1103). Although not shown, embodiments of the present disclosure performed from the standpoint of a BS may include: transmitting DCI scheduling a single PUSCH or multiple PUSCHs to be received on a serving cell; and receiving the single PUSCH or the multiple PUSCHs on the serving cell based on the DCI.

Specifically, the payload size of the DCI received by the UE and/or the payload size of the DCI transmitted by the BS may be determined based on the larger of the number of information bits for scheduling the single PUSCH and the number of information bits for scheduling the multiple PUSCHs. The number of information bits for scheduling the single PUSCH may be configured by further including information necessary for the PUSCH scheduling in overhead 1 described above in Embodiment 4. The number of information bits for scheduling the multiple PUSCHs may be configured by further including the information necessary for PUSCH scheduling in overhead 2 described above in Embodiment 4. For example, the information necessary for PUSCH scheduling may include a time domain resource assignment field, a frequency domain resource assignment field, a frequency hopping flag field, a modulation and coding scheme field, a HARQ process number field, a TPC command for scheduled PUSCH field, a precoding information and number of layers field, and/or antenna ports.

To determine the payload size of the DCI received by the UE and/or the payload size of the DCI transmitted by the BS based on the larger of the number of information bits for scheduling the single PUSCH and the number of information bits for scheduling the multiple PUSCHs, the smaller number of information bits may coincide with the larger number of information bits by adding zero padding to the smaller of the number of information bits for scheduling the single PUSCH and the number of information bits for scheduling the multiple PUSCHs.

The DCI may include a CBGTI field only when the single PUSCH is scheduled, and the DCI may include no CBGTI field when the multiple PUSCHs are scheduled.

In addition, the DCI may include a UL-SCH indicator field only when the single PUSCH is scheduled, and the DCI may include no UL-SCH indicator field when the multiple PUSCHs are scheduled.

When the single PUSCH is scheduled, the size of an RV field included in the DCI may be set to two bits. When the multiple PUSCHs are scheduled, one bit may be configured for each of the PUSCHs schedulable by the DCI. That is, when the DCI is capable of scheduling N PUSCHs, the total number of RV field bits may be N bits.

When the single PUSCH is scheduled, the size of an NDI field included in the DCI may be set to one bit. When the multiple PUSCHs are scheduled, one bit may be configured for each of the PUSCHs schedulable by the DCI. That is, when the DCI is capable of scheduling N PUSCHs, the total number of NDI field bits may be N bits.

In addition to the operations of FIG. 11, at least one of the operations described with reference to FIGS. 1 to 10 and/or the operations described in Embodiments 1 to 5 may be combined and performed. For example, the BS may perform DL LBT before transmitting DCI, and the UE may perform UL LBT before transmitting one or multiple PUSCH(s). As another example, when a single PUSCH and/or a plurality of PUSCHs are scheduled, at least one of the methods described in Embodiments 1 to 5 may be applied.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 12:
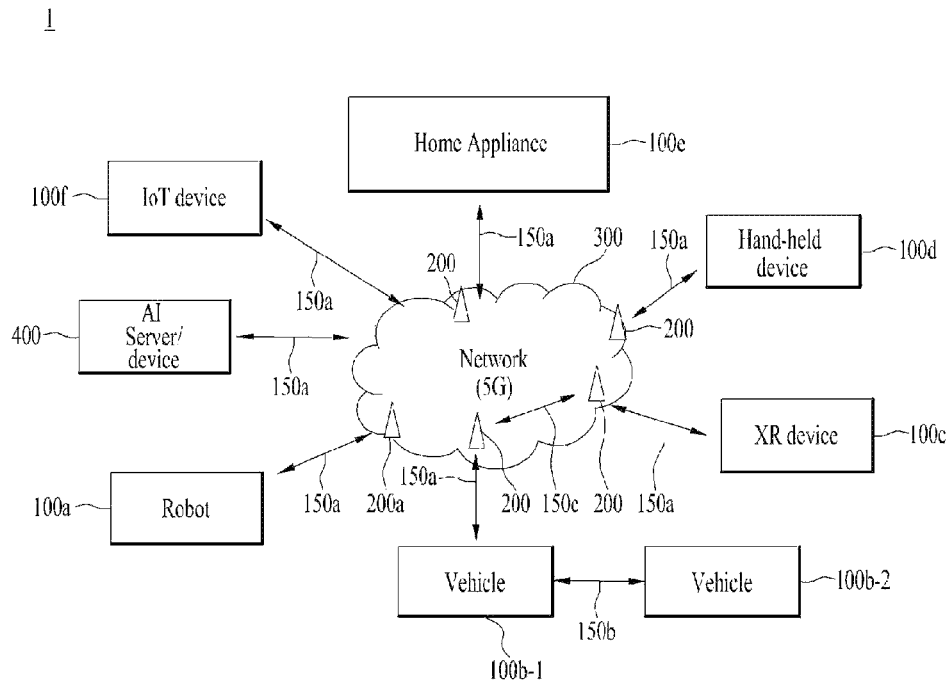
FIGS. 12 to 15 illustrate devices according to an embodiment of the present disclosure.

FIG. 12 illustrates a communication system 1 applied to the present disclosure.

Referring to FIG. 12, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 13:
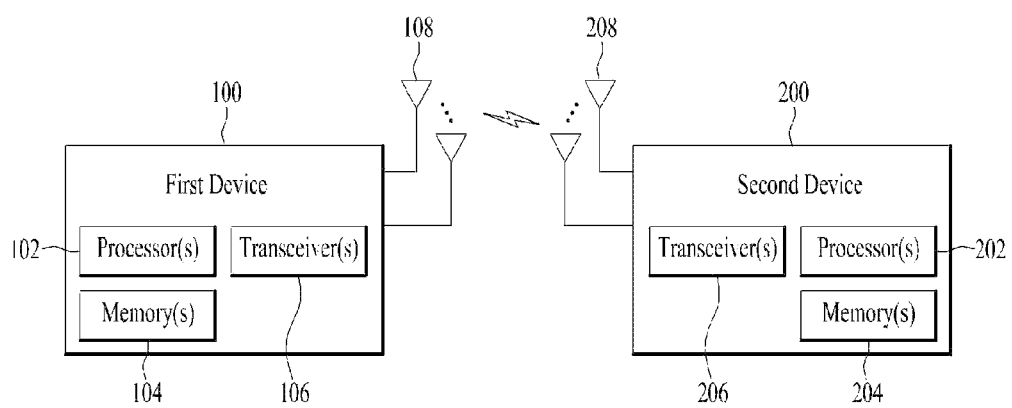

FIG. 13 illustrates wireless devices applicable to the present disclosure.

Referring to FIG. 13, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 14:
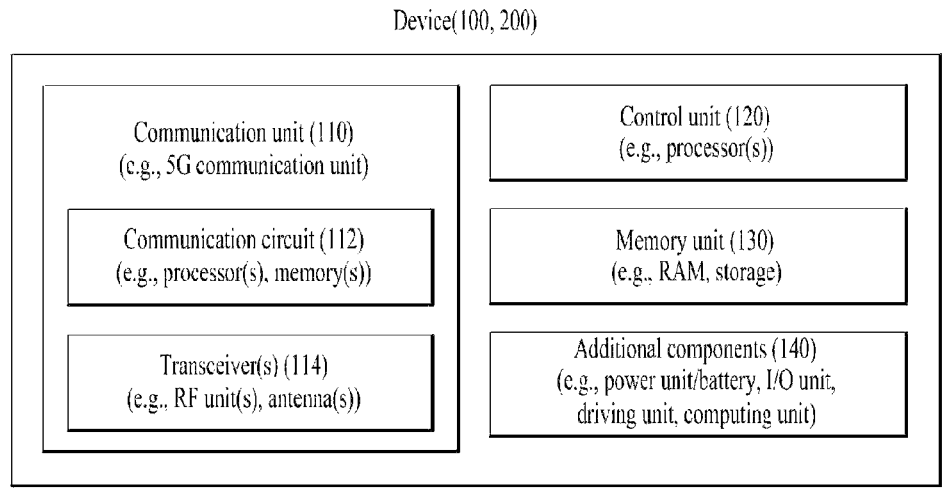

FIG. 14 illustrates another example of a wireless device applied to the present disclosure. The wireless device may be implemented in various forms according to a use case/service (refer to FIG. 12).

Referring to FIG. 14, wireless devices 100 and 200 may correspond to the wireless devices 100 and 200 of FIG. 13 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcasting terminal, a hologram device, a public safety device, an MTC device, a medical device, a FinTech device (or a finance device), a security device, a climate/environment device, the AI server/device (400 of FIG. 12), the BSs (200 of FIG. 12), a network node, or the like. The wireless device may be mobile or fixed according to a use case/service.

In FIG. 14, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 15:
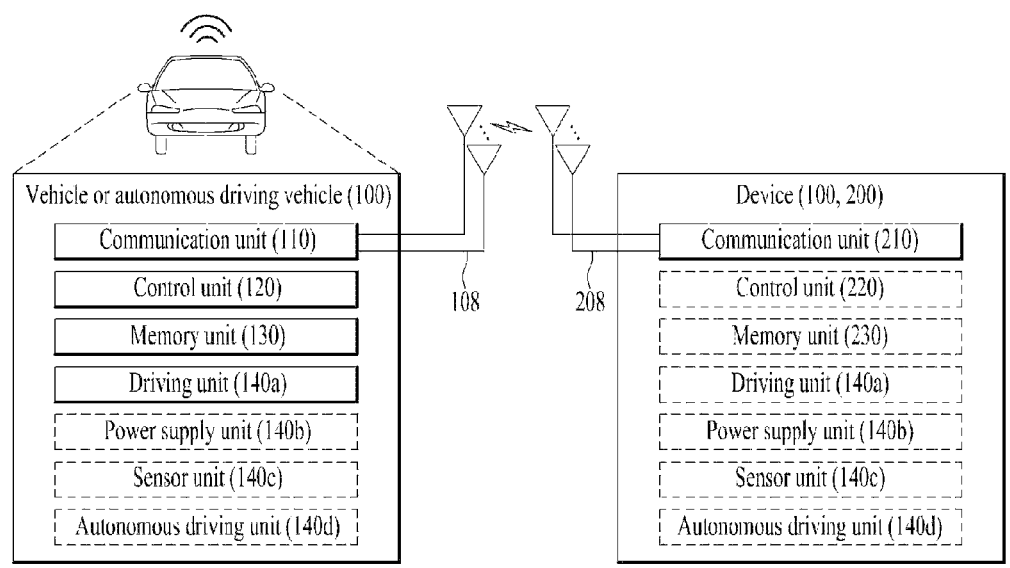

Example of Vehicle or Autonomous Driving Vehicle to which the Present Disclosure is Applied FIG. 15 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method of transmitting and receiving a signal by a user equipment (UE) in a wireless communication system, the method comprising:
    receiving downlink control information (DCI) scheduling multiple physical uplink shared channels (PUSCHs) to be transmitted on a serving cell; and
    transmitting the multiple PUSCHs on the serving cell based on the DCI,
    wherein a payload size of the DCI is determined based on a larger of a number of information bits for scheduling a single PUSCH and a number of information bits for scheduling the multiple PUSCHs by adding zeros to a smaller of the number of information bits for scheduling the single PUSCH and the number of information bits for scheduling the multiple PUSCHs, and
    wherein the DCI includes no codeblock group transmission information (CBGTI) field based on the scheduling of the multiple PUSCHs.

2. The method of claim 1,
    wherein the DCI includes an N-bit redundancy version (RV) field based on the scheduling of the multiple PUSCHs, and
    wherein the N bits are determined based on a maximum number of PUSCHs schedulable by the DCI.

3. The method of claim 2, wherein each of the N bits is related to one PUSCH among the schedulable PUSCHs.

4. A user equipment (UE) configured to transmit and receive a signal in a wireless communication system, the UE comprising:
    at least one transceiver;
    at least one processor; and at least one memory operably connected to the at least one processor and configured to store instructions that, when executed, cause the at least one processor to perform operations comprising:

receiving downlink control information (DCI) scheduling multiple physical uplink shared channels (PUSCHs) to be transmitted on a serving cell; and transmitting the multiple PUSCHs on the serving cell based on the DCI, wherein a payload size of the DCI is determined based on a larger of a number of information bits for scheduling a single PUSCH and a number of information bits for scheduling the multiple PUSCHs by adding zeros to a smaller of the number of information bits for scheduling the single PUSCH and the number of information bits for scheduling the multiple PUSCHs, and wherein the DCI includes no codeblock group transmission information (CBGTI) field based on the scheduling of the multiple PUSCHs.

5. The UE of claim 4,
wherein the DCI includes an N-bit redundancy version (RV) field based on the scheduling of the multiple PUSCHs, and
wherein the N bits are determined based on a maximum number of PUSCHs schedulable by the DCI.

6. The UE of claim 5, wherein each of the N bits is related to one PUSCH among the schedulable PUSCHs.

7. An apparatus for a user equipment (UE), the apparatus comprising:
at least one processor; and
at least one computer memory operably connected to the at least one processor and configured to, when executed, cause the at least one processor to perform operations comprising:

receiving downlink control information (DCI) scheduling multiple physical uplink shared channels (PUSCHs) to be transmitted on a serving cell; and transmitting the multiple PUSCHs on the serving cell based on the DCI, wherein a payload size of the DCI is determined based on a larger of a number of information bits for scheduling a single PUSCH and a number of information bits for scheduling the multiple PUSCHs by adding zeros to a smaller of the number of information bits for scheduling the single PUSCH and the number of information bits for scheduling the multiple PUSCHs, and wherein the DCI includes no codeblock group transmission information (CBGTI) field based on the scheduling of the multiple PUSCHs.

8. The apparatus of claim 7,
wherein the DCI includes an N-bit redundancy version (RV) field based on the scheduling of the multiple PUSCHs, and
wherein the N bits are determined based on a maximum number of PUSCHs schedulable by the DCI.

9. The apparatus of claim 8, wherein each of the N bits is related to one PUSCH among the schedulable PUSCHs.

* * * * *